US009568718B2

United States Patent
Nagamatsu et al.

(10) Patent No.: US 9,568,718 B2
(45) Date of Patent: Feb. 14, 2017

(54) CATADIOPTRIC LENS SYSTEM AND IMAGE PICKUP UNIT

(71) Applicant: Sony Corporation, Tokyo (JP)

(72) Inventors: Kodai Nagamatsu, Tokyo (JP); Takeshi Hatakeyama, Chiba (JP)

(73) Assignee: SONY CORPORATION, Tokyo (JP)

( * ) Notice: Subject to any disclaimer, the term of this patent is extended or adjusted under 35 U.S.C. 154(b) by 41 days.

(21) Appl. No.: 14/030,043

(22) Filed: Sep. 18, 2013

(65) Prior Publication Data

US 2014/0098277 A1    Apr. 10, 2014

(30) Foreign Application Priority Data

Oct. 4, 2012    (JP) .................................. 2012-221778

(51) Int. Cl.
*G02B 17/08* (2006.01)
*H04N 5/225* (2006.01)

(52) U.S. Cl.
CPC ........... *G02B 17/0804* (2013.01); *G02B 17/08* (2013.01); *G02B 17/0808* (2013.01); *H04N 5/2254* (2013.01)

(58) Field of Classification Search
CPC ............................ G02B 17/08; G02B 17/0804

USPC ........ 359/676, 684, 689, 554, 557, 726–736
See application file for complete search history.

(56) References Cited

U.S. PATENT DOCUMENTS

| 4,971,428 | A | * | 11/1990 | Moskovich | .................... 359/366 |
| 5,331,467 | A | * | 7/1994 | Sato | .............................. 359/731 |
| 2005/0153559 | A1 | * | 7/2005 | Shafer | .................. G02B 13/143 |
| | | | | | 438/692 |
| 2012/0212600 | A1 | * | 8/2012 | Nakano | ........................... 348/79 |
| 2012/0314291 | A1 | * | 12/2012 | Kogo et al. | ................... 359/557 |
| 2013/0010376 | A1 | * | 1/2013 | Hatakeyama | ................. 359/731 |

FOREIGN PATENT DOCUMENTS

JP           58-205124       11/1983

* cited by examiner

*Primary Examiner* — Thomas K Pham
*Assistant Examiner* — Mitchell Oestreich
(74) *Attorney, Agent, or Firm* — Chip Law Group

(57) ABSTRACT

A catadioptric lens system includes: a first lens group including a concave mirror and a convex mirror and having positive refractive power; a second lens group having positive refractive power; and a third lens group having negative refractive power, the first to third lens groups being provided, in order, on a light path of incident light and in a direction of travel of the incident light.

9 Claims, 14 Drawing Sheets

EXAMPLE 1 ns.tex
CATADIOPTRIC LENS SYSTEM AND IMAGE PICKUP UNIT

CROSS REFERENCE TO RELATED APPLICATIONS

This application claims the benefit of priority under 35 U.S.C. §119 from Japanese Priority Patent Application JP 2012-221778 filed Oct. 4, 2012, the entire contents of each of which is incorporated herein by reference.

BACKGROUND

The present disclosure relates to a catadioptric lens system that has a long focal length and is suitable for still image shooting and video shooting, and an image pickup unit using such a catadioptric lens system.

It is generally known that catadioptric lens systems configured of a reflective system and a refractive system are highly advantageous in reducing an entire lens length and reducing chromatic aberration, and have a configuration suitable for a long-focus lens. While typical focusing modes of the catadioptric lens systems include modes of varying the entire lens length, such as a unit focusing mode and a mode of changing a space between two reflection surfaces, there are inner focusing mode catadioptric lens systems in which an entire optical length is invariable. For example, Japanese Unexamined Patent Application Publication No. S58-205124 discloses a catadioptric lens system including a first lens group that includes a reflecting member and has positive refractive power, a second lens group that is movable along an optical axis and has negative refractive power, and a third lens group that has positive refractive power, the first to third lens groups being provided, in order, on a light path of incident light and in a direction of travel of the incident light. In the catadioptric lens system disclosed in Japanese Unexamined Patent Application Publication No. S58-205124, an afocal system is formed with use of the first lens group and the second lens group in an infinity focusing state, and traveling of the second lens group toward an image-plane side brings the catadioptric lens system into focus on an object at a short distance.

On the other hand, in recent years, there have been provided so-called single-lens mirrorless cameras that are single-lens reflex cameras without quick return mirrors. Since the quick return mirrors are removed, camera bodies are downsized, and convenience of portability is remarkably improved. Since, unlike the single-lens reflex cameras, in the single-lens mirrorless cameras, light constantly reaches an image pickup device for image pickup, the single-lens mirrorless cameras are suitable for high-quality video shooting. Moreover, a so-called wobbling technique has been generally known. In the wobbling technique, to keep focusing on an object moving back and forth with respect to a camera during video shooting, a lens is minutely vibrated, and is moved in a direction where high contrast is obtainable. To allow a focus group to perform a wobbling operation, it is preferable that the focus group have the inner focusing mode as a focusing mode, and be configured to be as small in size and weight as possible. When the size and weight of the focus group are reduced, a reduction in the size of an entire lens including a focus driving mechanism is achievable, and a reduction in power consumption caused by focus driving is also achievable.

SUMMARY

In a case where a catadioptric lens adopts the unit focusing mode as a focusing mode, a lens extension amount for focusing is increased with an increase in a focal length of the lens; therefore, the catadioptric lens adopting this mode is not suitable for downsizing. Moreover, since a weight of a driving portion is heavy, a large driving force is necessary, and it is difficult to cope with video shooting through a wobbling operation. In a case where the catadioptric lens adopts, as a focusing mode, the mode of changing a space between two reflection surfaces, it is possible to extremely reduce the lens extension amount; however, a driving mechanism needs a large driving force, and it is difficult to cope with video shooting as with the above-described unit focusing mode. Further, eccentricity between two reflection surfaces is extremely sensitive to optical performance, and it is difficult in manufacturing to sufficiently reduce the eccentricity caused by focusing. Further, since a change in a distance between two reflection surfaces is also optically extremely sensitive, an issue in design remains in that fluctuation in aberration during close-range focusing is increased.

In the catadioptric lens system disclosed in Japanese Unexamined Patent Application Publication No. S58-205124, since the inner focusing mode is adopted as a focusing mode, the focus group does not need a heavy mirror lens, and the driving force of the driving mechanism is allowed to be reduced. However, since the focus group travels between the two reflection surfaces, or near the reflection surfaces, it is difficult to secure a sufficient space for arrangement of the driving mechanism, and as a result, the lens size is increased. Moreover, since the catadioptric lens system is a lens with a long focal length, a photographed picture is blurred by hand movement, but the catadioptric lens system does not include a vibration-proofing mechanism. Accordingly, it is difficult to reduce the hand movement. To achieve a reduction in hand movement, it is necessary to include a vibration-proofing group. Further, since the catadioptric lens system includes the first lens group having positive refractive power, the second lens group having negative refractive power, and the third lens group having positive refractive power, and an angle with respect to an optical axis of an outermost light beam passing through a surface located closest to an image pickup device is reduced to increase a distance to a position where an image is formed on the image pickup device is increased, it is necessary to have a long back focus; therefore, the catadioptric lens system is disadvantageous in downsizing. Furthermore, it is extremely difficult to perform a process of boring a hole through a mirror lens, and to provide a mechanism which holds an optical system in proximity to a hole portion. In addition, it is difficult in manufacturing to reduce eccentricity caused by focusing sensitive to optical performance, and to reduce fluctuation in aberration during close-range focusing, it is necessary for the catadioptric lens system to be configured of a large number of lenses. As a result, there are issues in that the weight of the focus group is increased, and the driving mechanism is upsized.

It is desirable to provide a catadioptric lens system with a small size, a light weight, and a long focal length, and an image pickup unit including such a catadioptric lens system.

According to an embodiment of the present disclosure, there is provided a catadioptric lens system including: a first lens group including a concave mirror and a convex mirror and having positive refractive power; a second lens group having positive refractive power; and a third lens group having negative refractive power, the first to third lens groups being provided, in order, on a light path of incident light and in a direction of travel of the incident light.

According to an embodiment of the present disclosure, there is provided an image pickup unit provided with a catadioptric lens system and an image pickup device, the image pickup device configured to output an image pickup signal corresponding to an optical image formed by the catadioptric lens system, the catadioptric lens system including: a first lens group including a concave mirror and a convex mirror and having positive refractive power; a second lens group having positive refractive power; and a third lens group having negative refractive power, the first to third lens groups being provided, in order, on a light path of incident light and in a direction of travel of the incident light.

In the catadioptric lens system and the image pickup unit according to the embodiments of the present disclosure, while the lens system adopts a catadioptric configuration including a concave mirror and a convex mirror in the first lens group, optimization of an entire refractive power arrangement and optimization of the configuration of each of the lens groups are achieved.

In the catadioptric lens system and the image pickup unit according to the embodiments of the present disclosure, while the lens system adopts a catadioptric configuration advantageous for a long focal length, optimization of the entire refractive power arrangement and optimization of the configuration of each of the lens groups are achieved; therefore, an optical system with a small size, a light weight, and a long focal length is obtainable.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the technology, and are incorporated in and constitute a part of this specification. The drawings illustrate embodiments and, together with the specification, serve to explain the principles of the technology.

DETAILED DESCRIPTION

Figure 1:
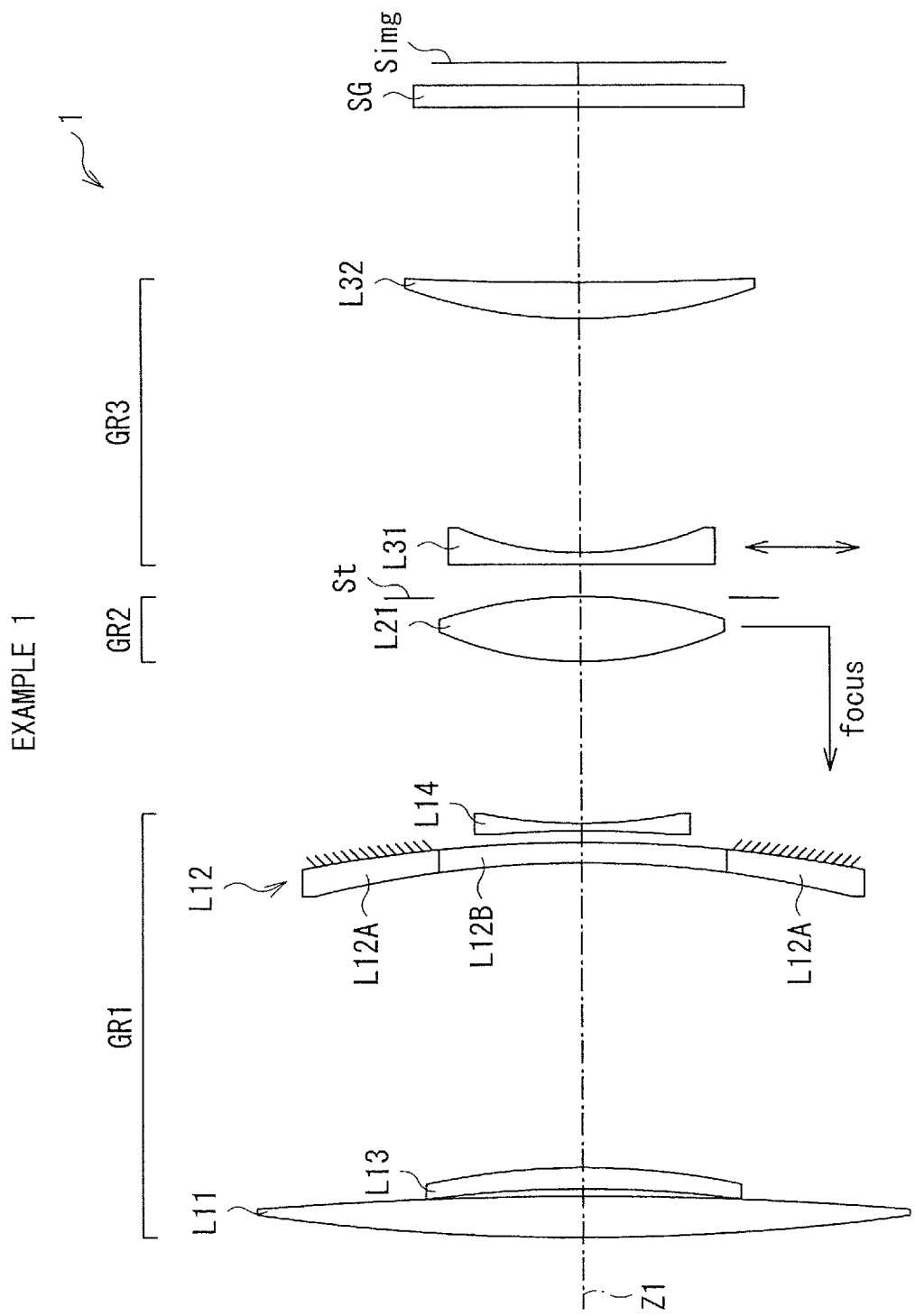
FIG. 1 is a sectional view illustrating a first configuration example of a catadioptric lens system according to an embodiment of the present disclosure.
Figure 2:
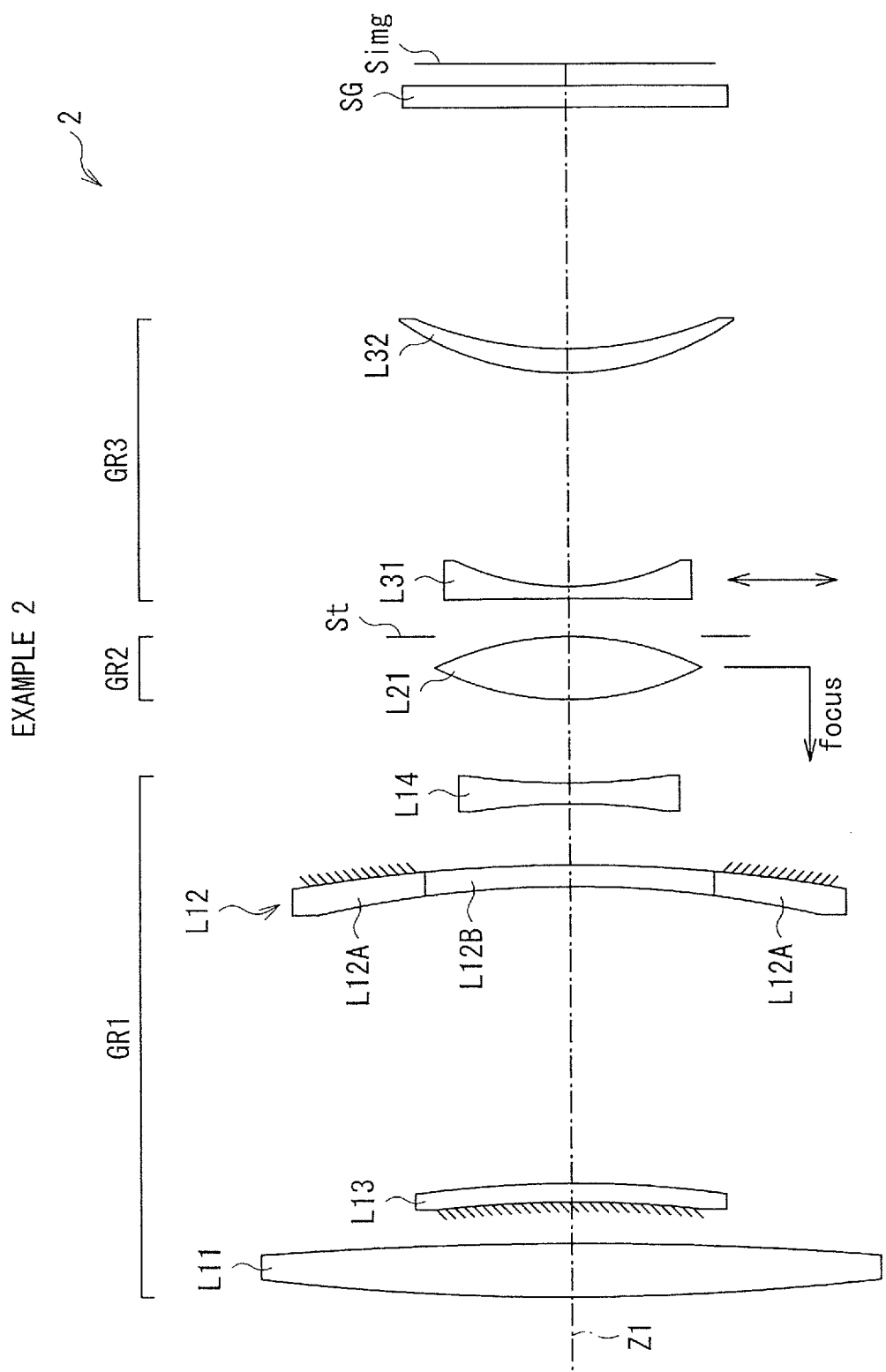
FIG. 2 is a sectional view illustrating a second configuration example of the catadioptric lens system.
Figure 3:
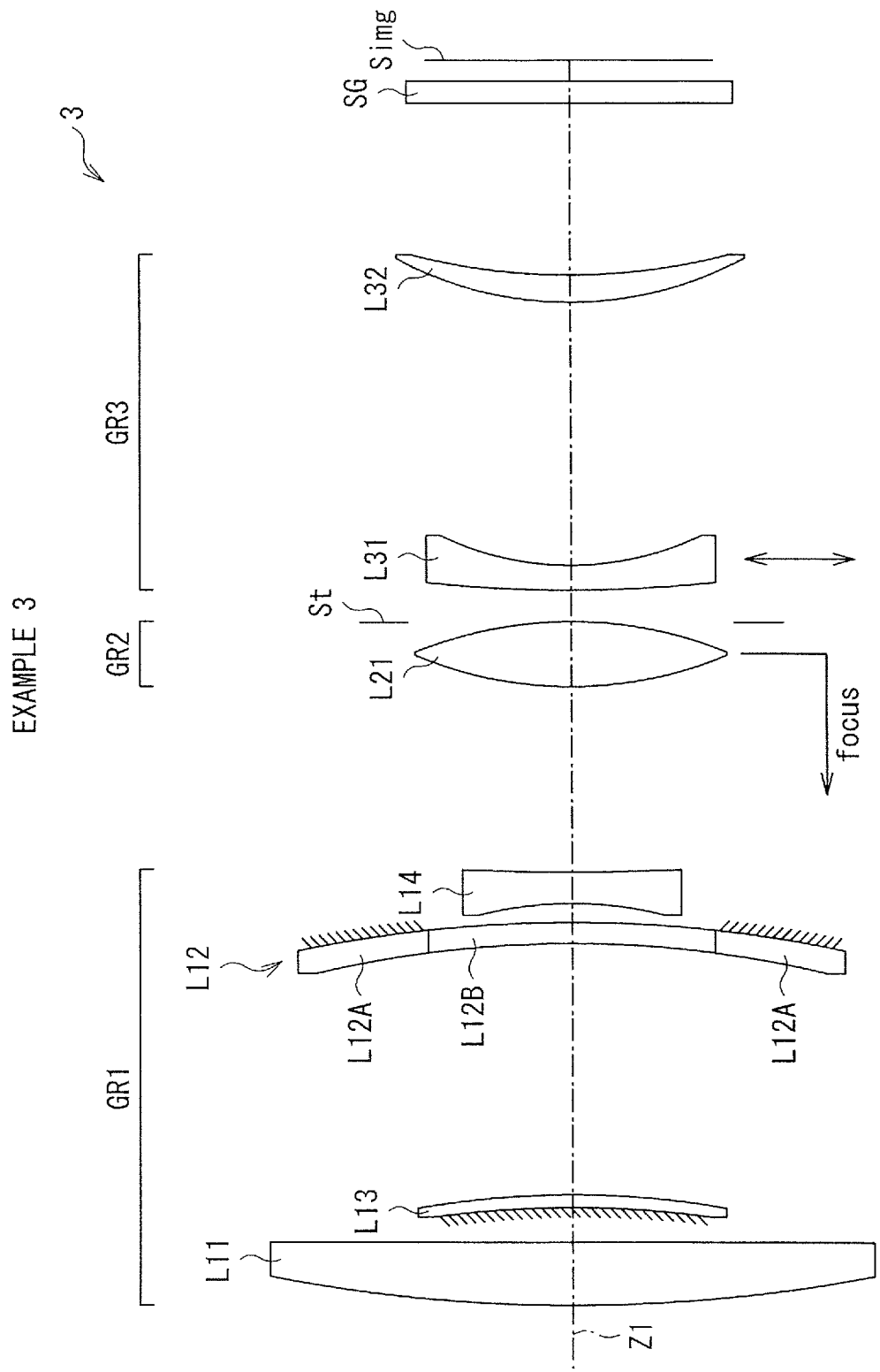
FIG. 3 is a sectional view illustrating a third configuration example of the catadioptric lens system.
Figure 4:
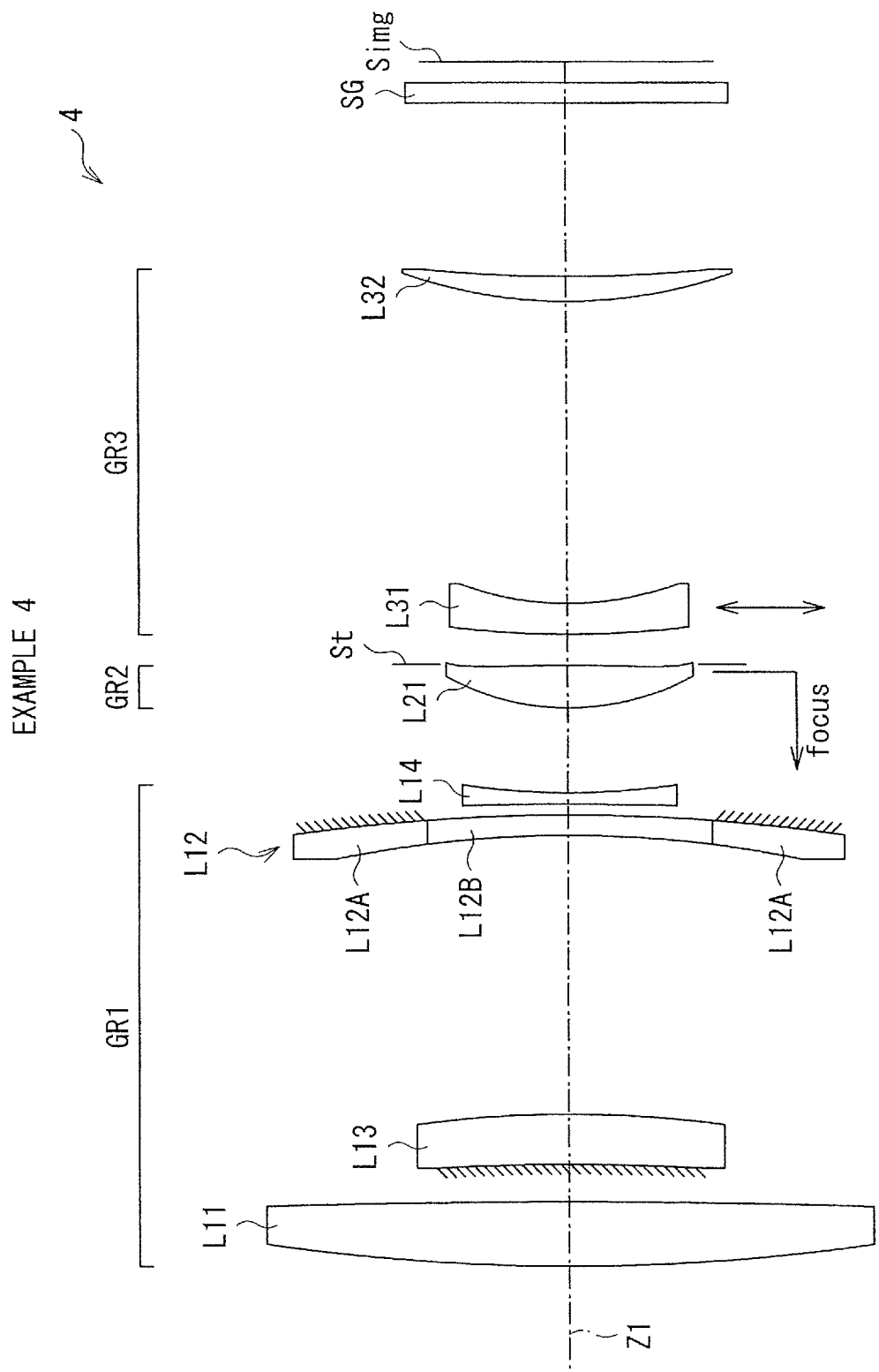
FIG. 4 is a sectional view illustrating a fourth configuration example of the catadioptric lens system.

Some embodiments of the present disclosure will be described in detail below referring to the accompanying drawings. It is to be noted that description will be given in the following order.
1. Basic configuration of lens
2. Functions and effects
3. Application example to image pickup unit
4. Numerical examples of lens
5. Other embodiments 1. Basic Configuration of Lens FIG. 1 illustrates a first configuration example of a catadioptric lens system according to an embodiment of the present disclosure. The configuration example corresponds to a lens configuration of Numerical Example 1 which will be described later. Likewise, FIGS. 2 to 4 illustrate second to fourth configuration examples corresponding to lens configurations of Numerical Examples 2 to 4, respectively, which will be described later. In FIG. 1 and the like, "Simg" represents an image plane, and "Z1" represents an optical axis.

Although the configuration of the catadioptric lens system according to the embodiment will be described appropriately corresponding to configuration examples illustrated in FIG.

1 and the like, the technology of the present disclosure is not limited to the configuration examples illustrated in the drawings.

The catadioptric lens system according to the embodiment includes a first lens group GR1 including a concave mirror L12A and a convex mirror L13 and having positive refractive power, a second lens group GR2 having positive refractive power, and a third lens group GR3 having negative refractive power, the first to third lens groups GR1 to GR3 being provided, in order, on a light path of incident light and in a direction of travel of the incident light.

It is to be noted that, for example, in the first configuration example in FIG. 1, the first lens group GR1 includes a meniscus-shape lens L12 that has a first surface on an object-plane side and a second surface on an image-plane side. The first surface is a concave transparent surface, and the second surface has a reflection surface in a peripheral region and a transparent surface in a center region. The concave mirror L12A is formed in the peripheral region, and a transmissive-refractive lens section L12B is formed in the center region. The convex mirror L13 has a third surface on an object-plane side and a fourth surface on an image-plane side. The third surface is a reflection surface, and the fourth surface is a convex transparent surface.

The second lens group GR2 may be preferably disposed on the image-plane side of the concave mirror L12A. Moreover, traveling of the second lens group GR2 in a direction parallel to the optical axis Z1 may preferably bring the catadioptric lens system into focus on an object at a short distance. The second lens group GR2 may be preferably configured of one convex lens L21.

The third lens group GR3 includes a concave lens L31 located at a most-object-plane-side position thereof, and vibration-proofing may be preferably performed through shifting the concave lens L31 in a direction perpendicular to the optical axis Z1.

The catadioptric lens system according to the embodiment may preferably satisfy the following predetermined conditional expressions and the like.

2. Functions and Effects

Next, functions and effects of the catadioptric lens system according to the embodiment will be described below.

In the catadioptric lens system according to the embodiment, a lens size thereof is allowed to be downsized to an impractical size for a long focal length lens using a dioptric system. In the catadioptric lens system, light having passed through the first lens group GR1 with positive refractive power passes through the second lens group GR2 having positive refractive power, and then passes through the third lens group GR3 having negative refractive power, thereby increasing an angle with respect to the optical axis Z1 of an outermost light beam having passed through a surface located closest to an image pickup device. Thus, a distance (back focus) to a position where an image is formed on the image pickup device is allowed to be reduced, and an entire optical length is allowed to be reduced. Therefore, downsizing of an entire lens is achievable.

Since the catadioptric lens system according to the embodiment includes the first lens group GR1 having positive refractive power, the second lens group GR2 having positive refractive power, and the third lens group GR3 having negative refractive power, it is advantageous in reducing a size and weight of a focus group, and a lens size including a driving mechanism of the focus group is allowed to be reduced. More specifically, when the second lens group GR2 disposed on the image-plane side of the concave mirror L12A is used as the focus group, the size and weight of the focus group are allowed to be reduced. Since the size and weight of the focus group are allowed to be reduced, a wobbling operation is allowed to be performed during video shooting, and it is possible to favorably keep focusing on an object even during video shooting. In particular, when the focus group is configured of one convex lens L21, the weight of the lens group moved for focusing is allowed to be reduced, a driving mechanism configured to drive the focus group is allowed to be downsized, and a barrel is allowed to be downsized. Thus, while a reduction in the lens size is secured, high-speed focusing with low power consumption is achievable.

Moreover, in the catadioptric lens system according to the embodiment, the concave lens L31 located at a most-object-plane-side position of the third lens group GR3 is allowed to be shifted in a direction perpendicular to the optical axis Z1 to function as a vibration-proof group. The vibration-proof group produces a large effect on a reduction in hand movement caused when photographing in a dark place, or photographing a moving object.

(Description of Conditional Expressions)

The catadioptric lens system according to the embodiment is allowed to obtain more favorable performance through optimizing the configurations of the respective lens groups so as to satisfy one or more of the following conditional expressions, preferably to satisfy a combination of two or more of the following conditional expressions.

$$0 < f2/f < 0.4 \quad (1)$$

where f2 is a focal length of the second lens group GR2, and f is a total focal length of the catadioptric lens system that is in focus on an object at infinity.

When f2/f is greater than an upper limit of the conditional expression (1), power of the second lens group GR2 becomes too weak, and it is disadvantageous in a reduction in the entire length. On the contrary, when f2/f is lower than a lower limit of the conditional expression (1), the power of the second lens group GR2 becomes too strong, and focus fluctuation is increased. Therefore, while high optical performance is maintained, the entire optical length is allowed to be reduced through setting a numerical range of the conditional expression (1).

It is to be noted that, to obtain higher optical performance, the numeral range of the conditional expression (1) may be preferably set to the following conditional expression (1)'.

$$0.05 < f2/f < 0.3 \quad (1)'$$

$$-2.0 < f3/f < 0 \quad (2)$$

where f3 is a focal length of the third lens group GR3.

When f3/f is greater than an upper limit of the conditional expression (2), power of the third lens group GR3 becomes too weak, and performance during vibration-proofing is greatly degraded. On the contrary, when f3/f is lower than a lower limit of the conditional expression (2), the power of the third lens group GR3 becomes too strong, and it is disadvantageous in a reduction in the entire length. Therefore, while high optical performance is maintained, the entire optical length is allowed to be reduced through setting a numerical range of the conditional expression (2).

It is to be noted that, to obtain higher optical performance, the numeral range of the conditional expression (2) may be preferably set to the following conditional expression (2)'.

$$-1.5 < f3/f < 0 \quad (2)'$$

$$2.0 < (r2+r1)/(r2-r1) < 10 \quad (3)$$

where r1 is a curvature radius on the first surface of the concave mirror L12A, and r2 is a curvature radius on the second surface of the concave mirror L12A.

A conditional expression (3) defines a shape of the concave mirror L12A included in the first lens group GR1. When (r2+r1)/(r2−r1) is greater than an upper limit of the conditional expression (3), spherical aberration largely shifts toward negative, and astigmatism largely shifts toward positive, and on the contrary, the (r2+r1)/(r2−r1) is lower than a lower limit of the conditional expression (3), spherical aberration largely shifts toward negative, and astigmatism largely shifts toward negative; therefore, favorable aberration correction is difficult. Therefore, while high optical performance is maintained, the entire optical length is allowed to be reduced through setting a numerical range of the conditional expression (3).

It is to be noted that, to obtain higher optical performance, the numeral range of the conditional expression (3) may be preferably set to the following conditional expression (3)'.

$$4.0 < (r2+r1)/(r2-r1) < 9.5 \quad (3)'$$

$$0 < (r3+r4)/(r3-r4) < 8.0 \quad (4)$$

where r3 is a curvature radius of the third surface of the convex mirror L13, and r4 is a curvature radius of the fourth surface of the convex mirror L13.

A conditional expression (4) defines a shape of the convex mirror L13 included in the first lens group GR1. When (r3+r4)/(r3−r4) is greater than an upper limit of the conditional expression (4), spherical aberration largely shifts toward positive, and astigmatism largely shifts toward negative, and on the contrary, (r3+r4)/(r3−r4) is lower than a lower limit of the conditional expression (4), spherical aberration largely shifts toward negative, and astigmatism largely shifts toward positive; therefore, favorable aberration correction is difficult. Therefore, while high optical performance is maintained, the entire optical length is allowed to be reduced through setting a numerical range of the conditional expression (4).

It is to be noted that, to obtain higher optical performance, the numeral range of the conditional expression (4) may be preferably set to the following conditional expression (4)'.

$$2.0 < (r3+r4)/(r3-r4) < 7.0 \quad (4)'$$

Thus, in the embodiment, the lens system has a catadioptric configuration that is advantageous for a long focal length, and optimization of an entire refractive power arrangement and optimization of the configuration of each of the lens groups are achieved; therefore, an optical system with a small size, a light weight, and a long focal length is obtainable.

3. Application Examples to Image Pickup Unit

Figure 19:
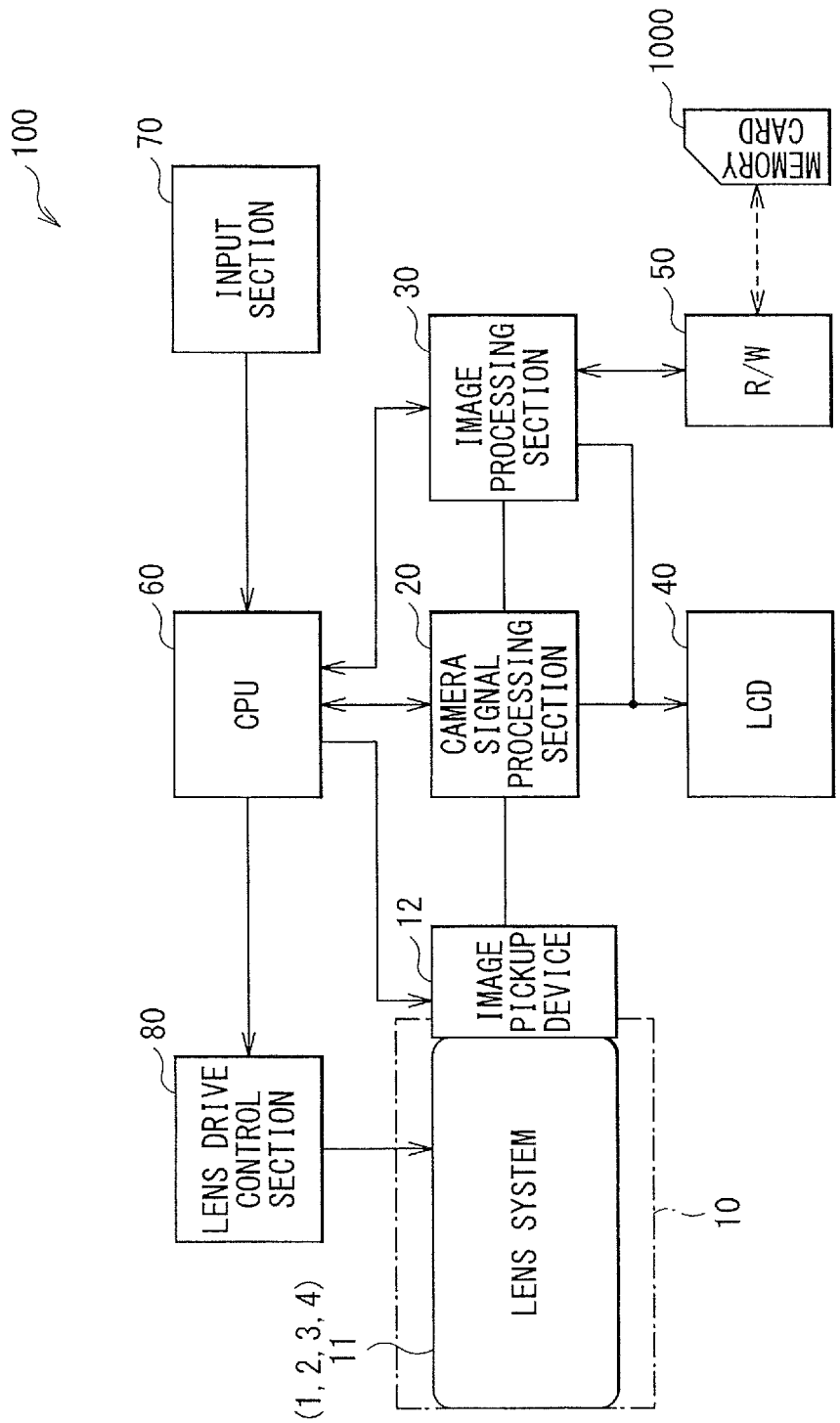
FIG. 19 is a block diagram illustrating a configuration example of an image pickup unit.

FIG. 19 illustrates a configuration example of an image pickup unit 100 to which the catadioptric lens system according to the embodiment is applied. The image pickup unit 100 may be, for example, a digital still camera, and includes a camera block 10, a camera signal processing section 20, an image processing section 30, an LCD (Liquid Crystal Display) 40, an R/W (reader/writer) 50, a CPU (Central Processing Unit) 60, and an input section 70.

The camera block 10 has an image pickup function, and includes an optical system including a lens system 11 (catadioptric lens system 1, 2, 3, or 4) as an image pickup lens, and an image pickup device 12 such as a CCD (Charge Coupled Device) and a CMOS (Complementary Metal Oxide Semiconductor). The image pickup device 12 converts an optical image formed by the lens system 11 into an electrical signal to output an image pickup signal (an image signal) corresponding to the optical image.

The camera signal processing section 20 performs, on the image signal output from the image pickup device 12, various kinds of signal processing such as analog-to-digital conversion noise removal, image quality correction, and conversion to a luminance-chrominance signal.

The image processing section 30 performs a process of recording and reproducing the image signal, and performs compression-coding and decompression-decoding on the image signal based on a predetermined image data format, conversion of data specifications such as resolution, and the like.

The LCD 40 has a function of displaying a state of operation on the input section 70 by a user and various data such as a photographed image. The R/W 50 writes image data coded by the image processing section 30 to a memory card 1000, and reads image data recoded on the memory card 1000. The memory card 1000 may be, for example, a semiconductor memory attachable to and detachable from a slot connected to the R/W 50.

The CPU 60 functions as a control processing section which controls each circuit block included in the image pickup unit 100, and the CPU 60 controls each circuit block based on an instruction input signal from the input section 70 or the like. The input section 70 is configured of various switches and the like allowing a user to perform a desired operation, and may be configured of, for example, a shutter release button for performing a shutter operation, a selector switch for selecting an operation mode, and the like. The input section 70 outputs an instruction input signal corresponding to an operation by the user to the CPU 60. The lens drive control section 80 controls driving of lenses disposed in the camera block 10, and controls a motor or the like (not illustrated) which drives each of the lenses of the lens system 11 based on a control signal from the CPU 60.

Although not illustrated, the image pickup unit 100 includes a vibration detection section which detects vibrations of the image pickup unit 100 caused by hand movement.

An operation of the image pickup unit 100 will be described below.

In a standby mode of photographing, under the control of the CPU 60, the image signal captured with the lens block 10 is output to the LCD 40 through the camera signal processing section 20, and is displayed as a camera-through image. For example, when an instruction input signal for focusing is input from the input unit 70, the CPU 60 outputs a control signal to the lens drive control section 80, and a predetermined lens of the lens system 11 is moved based on control by the lens drive control section 80.

When a shutter (not illustrated) in the camera block 10 is operated in response to the instruction input signal from the input section 70, the captured image signal is output from the camera signal processing section 20 to the image processing section 30 to be compression-coded, and the processed signal is converted into digital data in a predetermined data format. The converted data is output to the R/W 50, and is written on the memory card 1000.

It is to be noted that focusing is performed through moving a predetermined lens of the lens system 11 by the lens drive control section 80 based on a control signal from the CPU 60, for example, when the shutter release button of the input section 70 is pressed halfway or is fully pressed for recording (photographing).

When image data recorded on the memory card 1000 is reproduced, the predetermined image data is read from the memory card 1000 by the R/W 50 according to an operation on the input section 70, and the image data is decompression-decoded by the image processing section 30 to form a reproduced image signal. Then, the reproduced image signal is output to the LCD 40, and a reproduced image is accordingly displayed.

Moreover, the CPU 60 operates the lens drive control section 80 based on a signal output from the vibration detection section (not illustrated), and allows a lens group for vibration-proofing to be shifted in a direction substantially perpendicular to the optical axis Z1 according to a vibration amount.

It is to be noted that, in the above-described embodiment, an example in which the image pickup unit is applied as the digital still camera is described; however, the application range of the image pickup unit is not limited to the digital still camera, and the image pickup unit 100 may be applied as any of other various electronic apparatuses, for example, interchangeable-lens cameras and digital video cameras.

EXAMPLES

4. Numerical Examples of Lens

Next, specific numerical examples of the catadioptric lens system according to the embodiment will be described below.

It is to be noted that the meanings of reference signs illustrated in the following tables and description are as follows. "Surface No" is the number of an ith surface, which is incremented in order, on a light path of incident light and in a direction of travel of the incident light. "Ri" is a paraxial radius (mm) of curvature of the ith surface. "Di" is a distance (mm) on an optical axis between the ith surface and an i+1th surface. "Ni" is a refractive index value at a d-line (with a wavelength of 587.6 nm) of an optical element material having the ith surface "vi" is an Abbe number at the d-line of the optical element material having the ith surface. "Infinity" as the value of "Ri" represents a plane, or an aperture stop (St). A surface with "STO" in the "surface No" is the aperture stop St.

A surface with "ASP" in the "Surface No" is an aspherical surface. A shape of the aspherical surface is represented by the following aspherical surface expression, where "x" is a distance (a sag amount) in an optical axis direction from a vertex of a lens surface, "Y" is a height in a direction perpendicular to the optical axis direction, "c" is a paraxial curvature (an inverse of a curvature radius) at the vertex of a lens, "K" is a comic constant, and "Ai" is an ith-order aspherical surface coefficient, where "i" is an integer of 3 or more. It is to be noted that, in respective tables showing the aspherical surface coefficient which will be described later, "E-i" is an exponent of a power having 10 as a base, that is, "$10^{-i}$". For example, "0.12345E-05" means "0.12345×$10^{-5}$".
(Aspherical Surface Expression)

$$x = cY^2/[1+\{1-(1+K)c^2Y^2\}^{1/2}] + \Sigma Ai \cdot Y^i$$

(Configuration Common to Respective Numerical Examples)

Catadioptric lens systems according to the following respective numerical examples had the above-described basic lens configuration and a configuration satisfying preferable conditions. The catadioptric lens systems according to the respective numeral examples each included the first lens group GR1 including the concave mirror L12A and the convex mirror L13 and having positive refractive power, the second lens group GR2 having positive refractive power, and the third lens group GR3 having negative refractive power. The first to third lens groups GR1 to GR3 were provided, in order, on a light path of incident light and in a direction of travel of the incident light.

The first lens group GR1 included the convex lens L11, the meniscus-shape lens L12 with a concave surface toward the object-plane side, the convex mirror L13, and the concave lens L14 which were provided, in order, on a light path of incident light and in a direction of travel of the incident light. The concave mirror L12A was formed in a peripheral region of the meniscus-shape lens L12 with a concave surface toward the object-plane side through forming a reflection surface on a surface on an image-plane side of the peripheral region of the meniscus-shape lens L12, and the transmissive-refractive lens section L12B was formed in a center region of the meniscus-shape lens L12. Moreover, the convex mirror L13 was formed through forming a reflection surface on a surface on the object-plane side of a meniscus-shape lens with a convex surface toward the image-plane side. The convex mirror L13 was disposed between the convex lens L11 and the meniscus-shape lens L12. It is to be noted that light beams incident on the first lens group GR1 passed through the convex lens L11, the concave mirror L12A, the convex mirror L13, the lens section L12B of the meniscus-shape lens L12, and the concave lens L14 in this order.

The second lens group GR2 was disposed on an image-plane side of the concave mirror L12A. Traveling of the second lens group GR2 in a direction parallel to the optical axis Z1 brought the catadioptric lens system into focus on an object in a short distance. The second lens group GR2 was configured of one convex lens L21. The aperture stop St was disposed on the image-plane side of the second lens group GR2, and upon focusing, the aperture stop St integrally travels together with the second lens group GR2.

The third lens group GR3 included the concave lens L31 and a meniscus lens L32 in this order from the object-plane side. Vibrations were prevented through shifting the concave lens L31 in a direction perpendicular to the optical axis Z1.

An optical member SG such as a seal glass for image pickup device protection and any of various optical filters was disposed between the third lens group GR3 and the image plane Simg.

Numerical Example 1

Tables 1 to 3 illustrate a specific numerical example corresponding to the catadioptric lens system 1 according to a first configuration example illustrated in FIG. 1. More specifically, Table 1 illustrates basic lens data, Table 2 illustrates data of the aspherical surface, and Table 3 illustrates other data.

In Numerical Example 1, both surfaces of the concave lens L14 in the first lens group GR1 and both surfaces of the convex lens L21 of the second lens group GR2 were aspherical surfaces. Table 2 illustrates values of fourth-order, sixth-order, eighth-order, and tenth-order aspherical surface coefficients A4, A6, A8, and A10, respectively, together with values of comic constants K.

Table 3 illustrates focal lengths f, F-numbers Fno, and half angles of view ω when focusing at infinity, at an intermediate distance (a magnification of 1/40), and at a minimum object distance (MOD). In Numerical Example 1, surface separations D12 and D15 preceding and following the second lens group GR2 varied when focusing between infinity and the minimum object distance. Table 3 also illustrates values of surface separations D12 and D15 when focusing at infinity, at the intermediate distance, and at the minimum object distance.

TABLE 1

Example 1

| Lens Group | Surface No | Ri | Di | Ni | νdi |
|---|---|---|---|---|---|
| GR1 | 1 | 218.9674 | 3.629519 | 1.641288 | 55.44878 |
|  | 2 | −485.644 | 31.38505 |  |  |
|  | 3 | −105.219 | 1.973016 | 1.888146 | 40.80476 |
|  | 4 | −141.649 | −1.97302 | −1.88815 | 40.80476 |
|  | 5 | −105.219 | −28.6437 |  |  |
|  | 6 | −84.2875 | −1.96347 | −1.65222 | 33.84 |
|  | 7 | −122.805 | 1.963474 | 1.652218 | 33.84 |
|  | 8 | −84.2875 | 28.64373 |  |  |
|  | 9 | −105.219 | 1.973016 | 1.888146 | 40.80476 |
|  | 10 | −141.649 | 1.164018 |  |  |
|  | 11(ASP) | −81.3077 | 0.765 | 1.887646 | 37.22069 |
|  | 12(ASP) | 53.12435 | (D12) |  |  |
| GR2 | 13(ASP) | 31.89373 | 6 | 1.5334 | 55.90526 |
|  | 14(ASP) | −43.7244 | 0 |  |  |
|  | 15(STO) | Infinity | (D15) |  |  |
| GR3 | 16 | −2169.99 | 1 | 1.791948 | 47.49306 |
|  | 17 | 29.03838 | 22.04439 |  |  |
|  | 18 | 49.88223 | 3.291627 | 1.855049 | 23.7844 |
|  | 19 | 279.5786 | 16.46657 |  |  |
| SG | 20 | Infinity | 2 | 1.51872 | 64.19733 |
|  | 21 | Infinity | 2 |  |  |

TABLE 2

Example 1

| Surface No | K | A4 | A6 | A8 | A10 |
|---|---|---|---|---|---|
| 11 | 0 | 1.2E−05 | −7.9E−08 | 0 | 0 |
| 12 | 0 | 1.01E−05 | −7.5E−08 | 5.88E−11 | −4.3E−13 |
| 13 | 0 | −4.4E−06 | −6.3E−08 | 4.83E−10 | −1.8E−12 |
| 14 | 0 | 5.28E−06 | −7.8E−08 | 5.63E−10 | −1.9E−12 |

TABLE 3

Example 1

|  | INF | 1/40 | MOD |
|---|---|---|---|
| Fno | 4.67044 | 4.59954 | 4.51836 |
| F | 256.875 | 248.739 | 241.35 |
| ω | 3.05013 | 3.11606 | 3.15609 |
| D12 | 15.2267 | 12.9805 | 10.8439 |
| D15 | 3.05414 | 5.30031 | 7.4369 |

Figure 5:
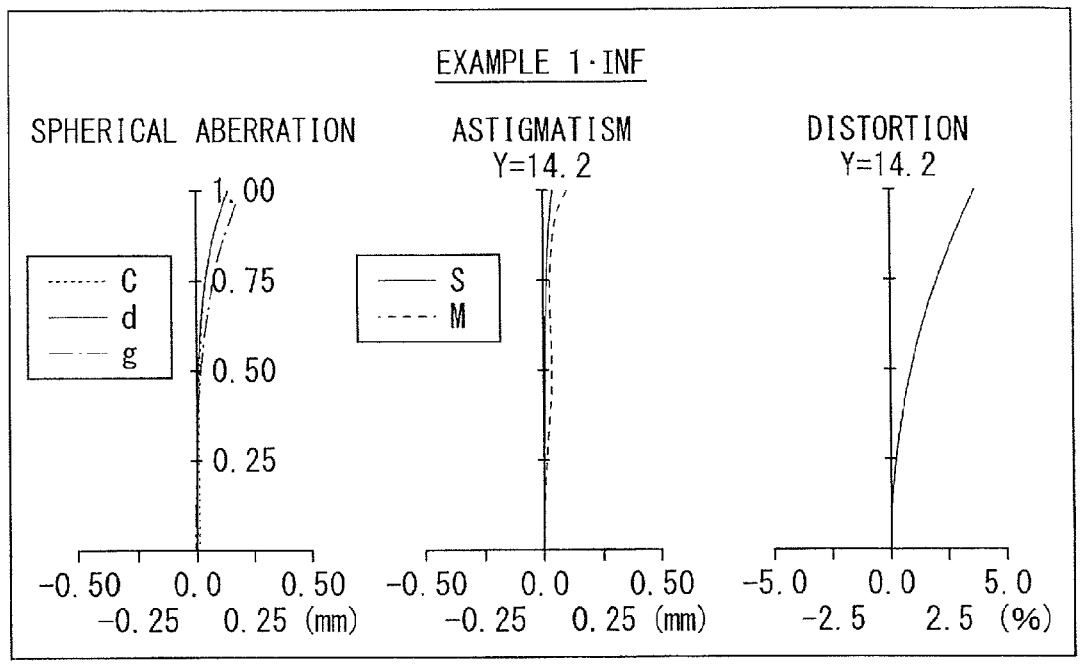
FIG. 5 is an aberration diagram illustrating spherical aberration, astigmatism, and distortion when focusing at infinity of a catadioptric lens system corresponding to Numerical Example 1.
Figure 6:
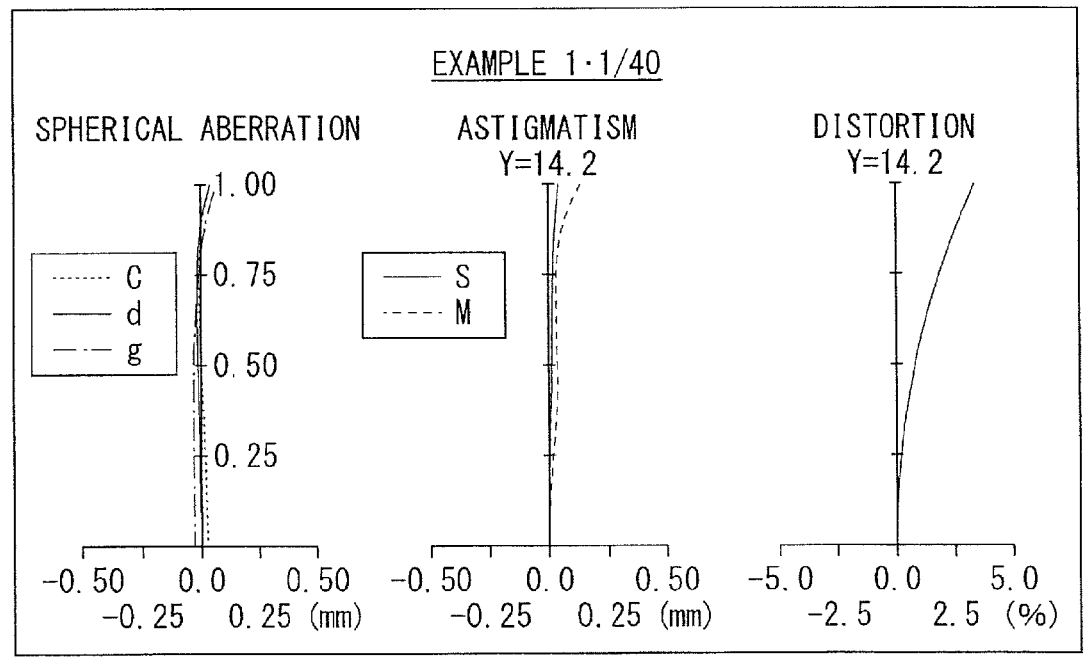
FIG. 6 is an aberration diagram illustrating spherical aberration, astigmatism, and distortion when focusing at an intermediate distance of the catadioptric lens system corresponding to Numerical Example 1.
Figure 7:
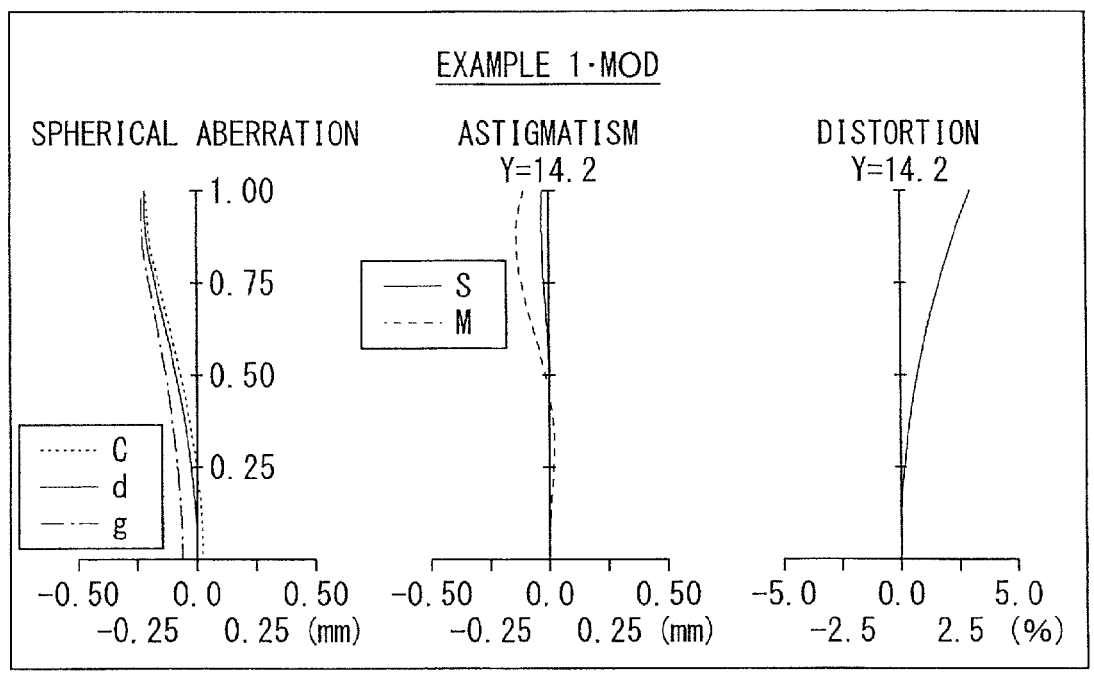
FIG. 7 is an aberration diagram illustrating spherical aberration, astigmatism, and distortion when focusing at a minimum distance of the catadioptric lens system corresponding to Numerical Example 1.

Aberration performance of the catadioptric lens system 1 corresponding to Numerical Example 1 is illustrated in FIGS. 5 to 7. FIG. 5 illustrates aberration when focusing at infinity. FIG. 6 illustrates aberration when focusing at the intermediate distance (a magnification of 1/40). FIG. 7 illustrates aberration when focusing at the minimum object distance (MOD).

FIGS. 5 to 7 illustrate, as aberration diagrams, spherical aberration, astigmatism (curvature of field), and distortion. In these aberration diagrams, aberrations at a reference wavelength of the d-line (587.6 nm) are illustrated. In diagrams of spherical aberration, aberrations at a C-line (656.27 nm) and aberrations at a g-line (435.83 nm) are also illustrated. In diagrams of astigmatism, a solid line (S) and a broken line (M) indicate aberration on a sagittal image plane and aberration on a meridional image plane, respectively. Y indicates an image height.

Figure 8:
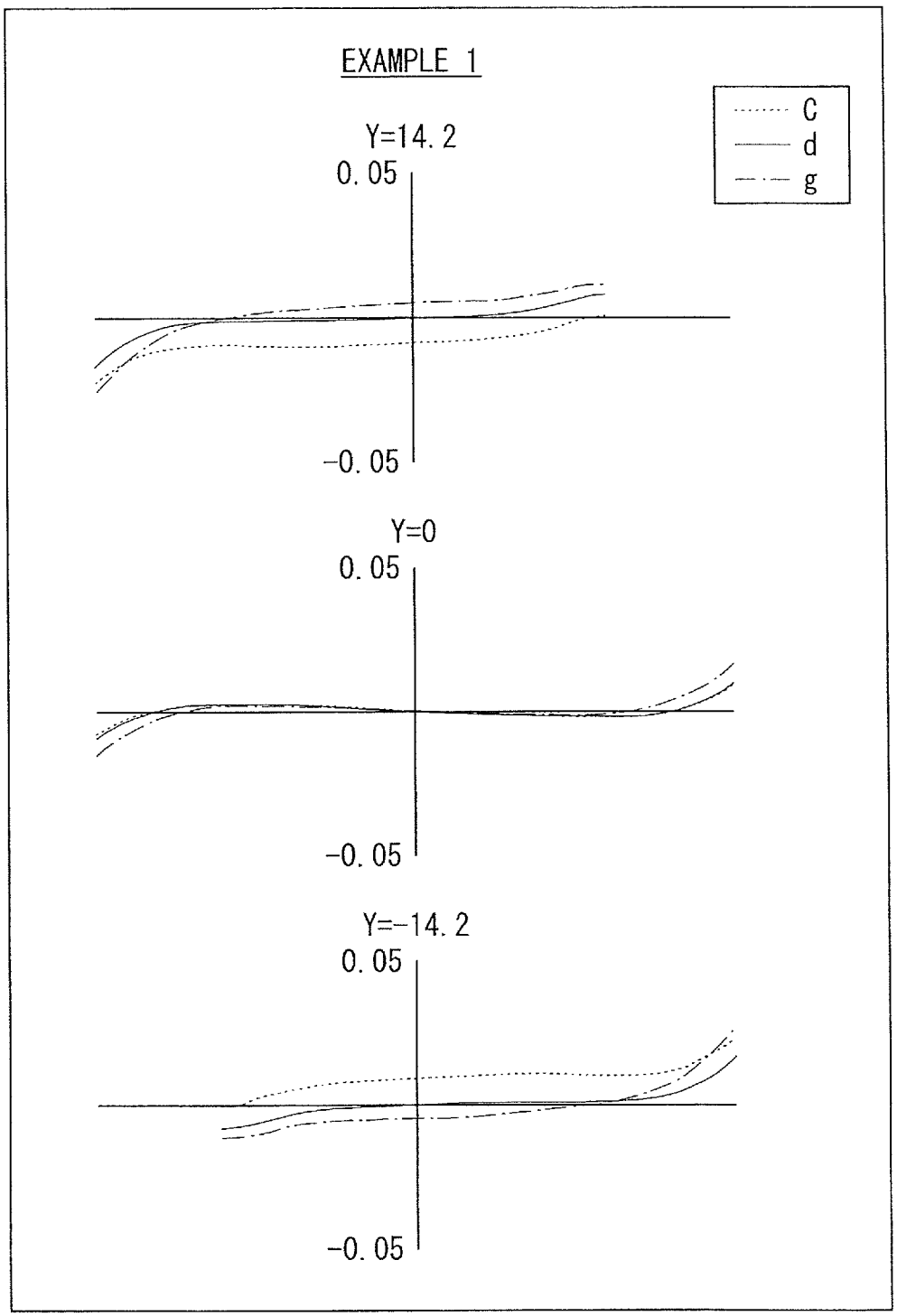
FIG. 8 is an aberration diagram illustrating lateral aberrations of the catadioptric lens system without vibration-proofing corresponding to Numeral Example 1.
Figure 9:
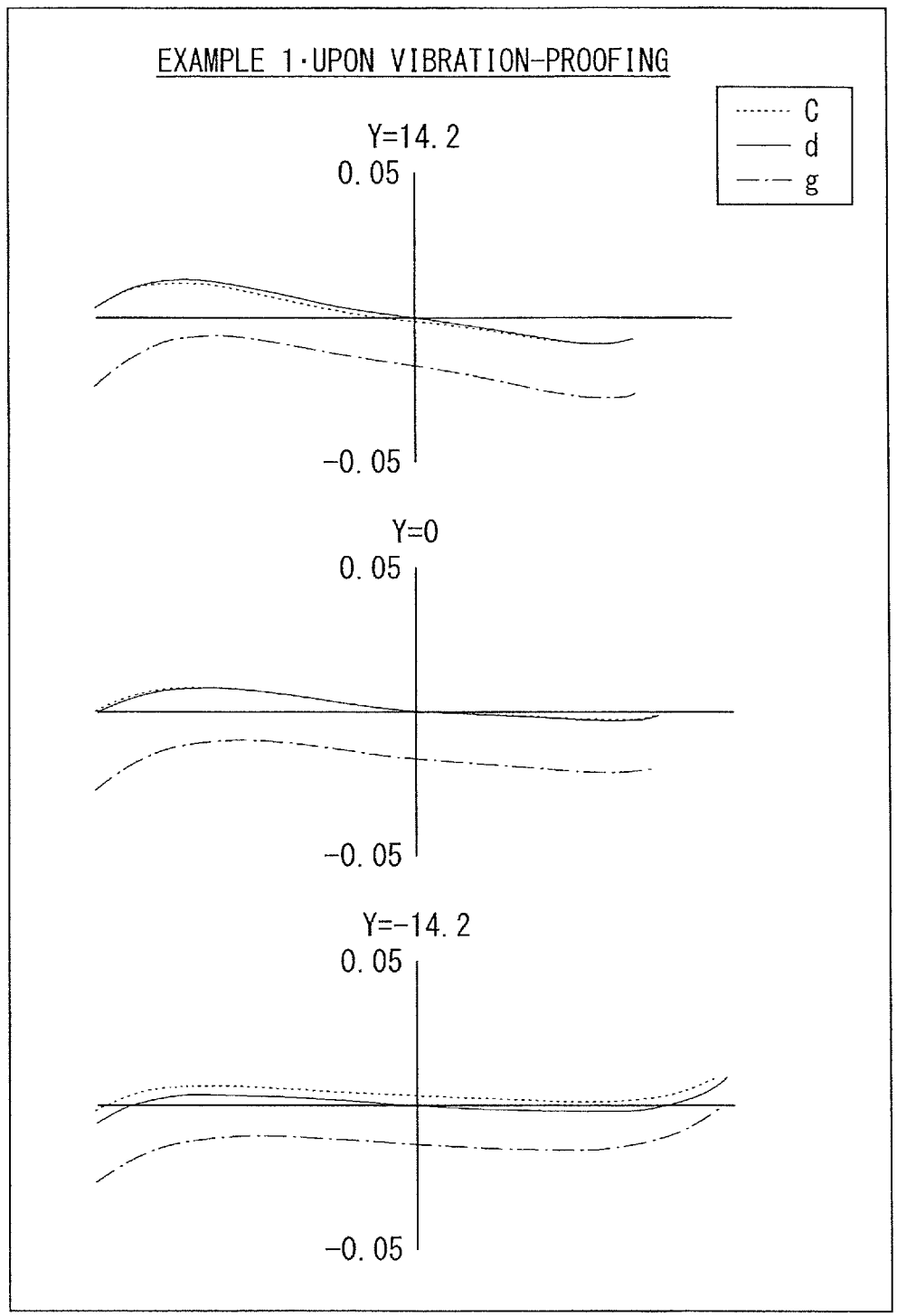
FIG. 9 is an aberration diagram illustrating lateral aberrations of the catadioptric lens system with vibration-proofing corresponding to Numeral Example 1.

Moreover, FIGS. 8 and 9 illustrate lateral aberration. FIG. 8 illustrates lateral aberration without vibration-proofing, and FIG. 9 illustrates lateral aberration with vibration-proofing.

As can be seen from the aberration diagrams, various aberrations were favorably corrected, and superior imaging performance was obtained.

Numerical Example 2

Tables 4 to 6 illustrate a specific numerical example corresponding to the catadioptric lens system 2 according to a second configuration example illustrated in FIG. 2. More specifically, Table 4 illustrates basic lens data, Table 5 illustrates data of the aspherical surface, and Table 6 illustrates other data.

In Numerical Example 2, both surfaces of the concave lens L14 in the first lens group GR1 and both surfaces of the convex lens L21 of the second lens group GR2 were aspherical surfaces. Table 5 illustrates values of fourth-order, sixth-order, eighth-order, and tenth-order aspherical surface coefficients A4, A6, A8, and A10, respectively, together with values of comic constants K.

Table 6 illustrates focal lengths f, F-numbers Fno, and half angles of view ω when focusing at infinity, at an intermediate distance (a magnification of 1/40), and at a minimum object distance (MOD). In Numerical Example 2, surface separations D12 and D15 preceding and following the second lens group GR2 varied when focusing between infinity and the minimum object distance. Table 6 also illustrates values of surface separations D12 and D15 when focusing at infinity, at the intermediate distance, and at the minimum object distance.

TABLE 4

Example 2

| Lens Group | Surface No | Ri | Di | Ni | νdi |
|---|---|---|---|---|---|
| GR1 | 1 | 259.8744 | 5 | 1.641288 | 55.44878 |
|  | 2 | −403.238 | 33.50497 |  |  |
|  | 3 | −104.998 | 2.144566 | 1.888146 | 40.80476 |
|  | 4 | −142.613 | −2.14457 | −1.88815 | 40.80476 |
|  | 5 | −104.998 | −27.7029 |  |  |
|  | 6 | −86.8406 | −1.85417 | −1.65222 | 33.84 |
|  | 7 | −124.483 | 1.854172 | 1.652218 | 33.84 |
|  | 8 | −86.8406 | 27.70289 |  |  |
|  | 9 | −104.998 | 2.144566 | 1.888146 | 40.80476 |
|  | 10 | −142.613 | 5.58246 |  |  |
|  | 11(ASP) | −64.8848 | 2 | 1.887646 | 37.22069 |
|  | 12(ASP) | 60.69755 | (D12) |  |  |
| GR2 | 13(ASP) | 24.12016 | 6 | 1.5334 | 55.90526 |
|  | 14(ASP) | −26.6335 | 0 |  |  |
|  | 15(STO) | Infinity | (D15) |  |  |
| GR3 | 16 | −238.482 | 1 | 1.791948 | 47.49306 |
|  | 17 | 23.4379 | 19.98374 |  |  |
|  | 18 | 26.69877 | 2.366614 | 1.855049 | 23.7844 |
|  | 19 | 36.61366 | 22.54332 |  |  |
| SG | 20 | Infinity | 2 | 1.51872 | 64.19733 |
|  | 21 | Infinity | 2 |  |  |

TABLE 5

Example 2

| Surface No | K | A4 | A6 | A8 | A10 |
|---|---|---|---|---|---|
| 11 | 5.910963 | 8.8E−06 | −7.7E−08 | −7.3E−11 | −5.2E−13 |
| 12 | −15.3514 | 1.15E−05 | −8.7E−08 | 1.51E−10 | −1.5E−12 |
| 13 | −0.5203 | −1.2E−05 | −5.6E−08 | 4.73E−10 | −1.6E−12 |
| 14 | −1.23437 | 7.68E−06 | −9.5E−08 | 6.34E−10 | −1.8E−12 |

TABLE 6

Example 2

| | INF | 1/40 | MOD |
|---|---|---|---|
| Fno | 4.935 | 4.95803 | 5.00355 |
| F | 247.471 | 233.995 | 221.925 |
| ω | 3.27947 | 3.33626 | 3.37823 |
| D12 | 7.78154 | 6.60478 | 5.42974 |
| D15 | 3.55929 | 4.73605 | 5.91109 |

Figure 10:
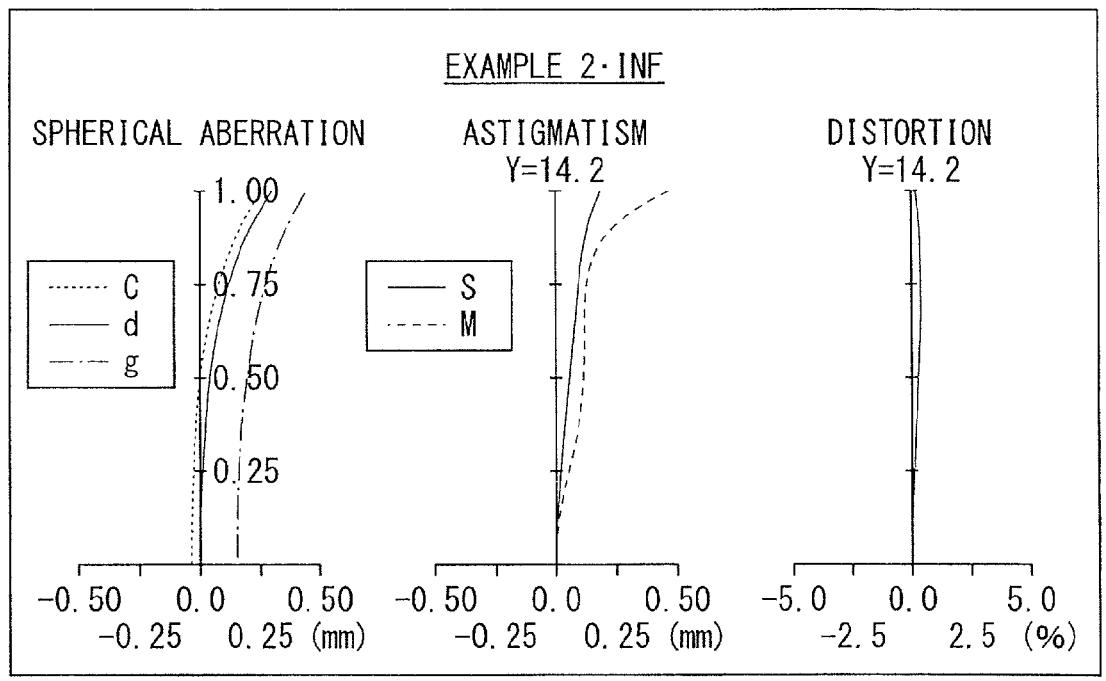
FIG. 10 is an aberration diagram illustrating spherical aberration, astigmatism, and distortion when focusing at infinity of a catadioptric lens system corresponding to Numerical Example 2.
Figure 11:
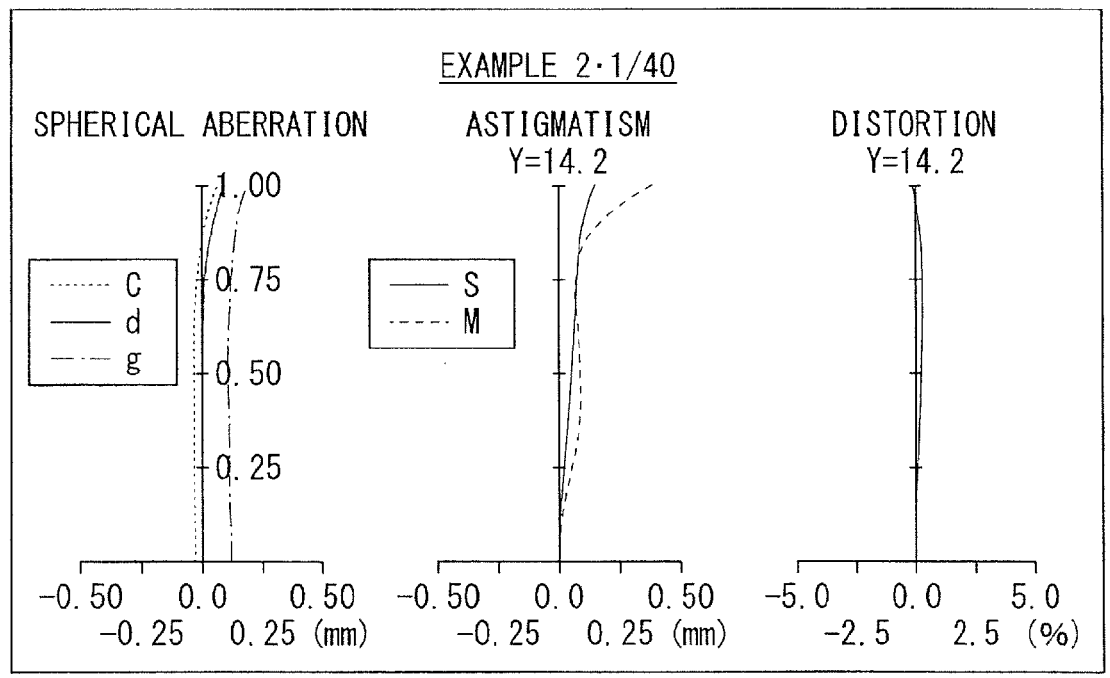
FIG. 11 is an aberration diagram illustrating spherical aberration, astigmatism, and distortion when focusing at an intermediate distance of the catadioptric lens system corresponding to Numerical Example 2.
Figure 12:
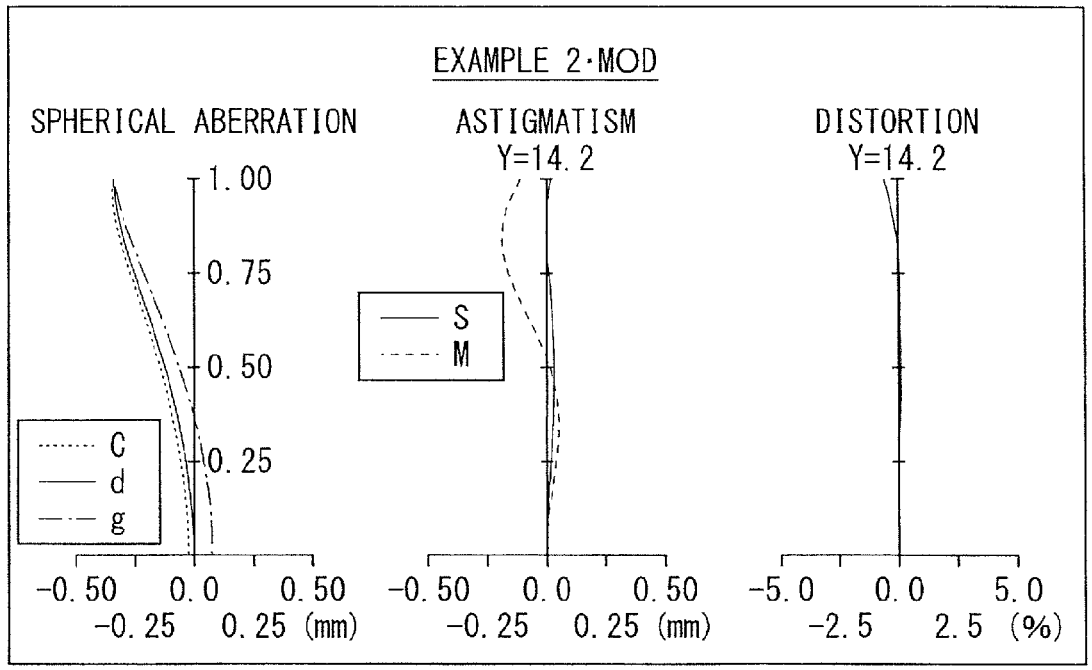
FIG. 12 is an aberration diagram illustrating spherical aberration, astigmatism, and distortion when focusing at a minimum distance of the catadioptric lens system corresponding to Numerical Example 2.

Aberration performance of the catadioptric lens system 2 corresponding to Numerical Example 2 is illustrated in FIGS. 10 to 12. FIG. 10 illustrates aberration when focusing at infinity. FIG. 11 illustrates aberration when focusing at the intermediate distance. FIG. 12 illustrates aberration when focusing at the minimum object distance.

FIGS. 10 to 12 illustrate, as aberration diagrams, spherical aberration, astigmatism (curvature of field), and distortion. In these aberration diagrams, aberrations at a reference wavelength of the d-line are illustrated. In diagrams of spherical aberration, aberrations at the C-line and aberrations at the g-line are also illustrated. In diagrams of astigmatism, a solid line (S) and a broken line (M) indicate aberration on a sagittal image plane and aberration on a meridional image plane, respectively. Y indicates an image height.

As can be seen from the aberration diagrams, various aberrations were favorably corrected, and superior imaging performance was obtained.

Numerical Example 3

Tables 7 to 9 illustrate a specific numerical example corresponding to the catadioptric lens system 3 according to a third configuration example illustrated in FIG. 3. More specifically, Table 7 illustrates basic lens data, Table 8 illustrates data of the aspherical surface, and Table 9 illustrates other data.

In Numerical Example 3, both surfaces of the concave lens L14 in the first lens group GR1 and both surfaces of the convex lens L21 of the second lens group GR2 were aspherical surfaces. Table 8 illustrates values of fourth-order, sixth-order, eighth-order, and tenth-order aspherical surface coefficients A4, A6, A8, and A10, respectively, together with values of comic constants K.

Table 9 illustrates focal lengths f, F-numbers Fno, and half angles of view ω when focusing at infinity, at the intermediate distance (a magnification of 1/40) and at the minimum object distance (MOD). In Numerical Example 3, surface separations D12 and D15 preceding and following the second lens group GR2 varied when focusing between infinity and the minimum object distance. Table 9 also illustrates values of surface separations D12 and D15 when focusing at infinity, at the intermediate distance, and at the minimum object distance.

TABLE 7

Example 3

| Lens Group | Surface No | Ri | Di | Ni | νdi |
|---|---|---|---|---|---|
| GR1 | 1 | 157.2192 | 5.847528 | 1.641288 | 55.44878 |
| | 2 | 8005.936 | 28.60318 | | |
| | 3 | −101.813 | 2 | 1.888146 | 40.80476 |
| | 4 | −127.589 | −2 | −1.88815 | 40.80476 |
| | 5 | −101.813 | −24.0279 | | |
| | 6 | −82.1397 | −1.3 | −1.65222 | 33.84 |
| | 7 | −112.256 | 1.3 | 1.652218 | 33.84 |
| | 8 | −82.1397 | 24.02792 | | |
| | 9 | −101.813 | 2 | 1.888146 | 40.80476 |
| | 10 | −127.589 | 1.824214 | | |
| | 11(ASP) | −32.0212 | 3 | 1.887646 | 37.22069 |
| | 12(ASP) | 7556.031 | (D12) | | |
| GR2 | 13(ASP) | 36.08403 | 6 | 1.5334 | 55.90526 |
| | 14(ASP) | −37.9228 | 0 | | |
| | 15(STO) | Infinity | (D15) | | |
| GR3 | 16 | 149.9979 | 2.306686 | 1.791948 | 47.49306 |
| | 17 | 28.68431 | 25.09276 | | |
| | 18 | 35.19557 | 2.488309 | 1.855049 | 23.7844 |
| | 19 | 58.1825 | 16.3 | | |
| SG | 20 | Infinity | 2 | 1.51872 | 64.19733 |
| | 21 | Infinity | 2 | | |

TABLE 8

Example 3

| Surface No | K | A4 | A6 | A8 | A10 |
|---|---|---|---|---|---|
| 11 | −2.28785 | 1.61E−05 | −7.8E−08 | −1.1E−10 | 2.62E−12 |
| 12 | 546947.9 | 1.86E−05 | −8.9E−08 | 1.5E−10 | 6.68E−13 |
| 13 | 0.688898 | −2.3E−06 | −6.5E−08 | 4.88E−10 | −1.5E−12 |
| 14 | −1.32173 | 8.77E−06 | −7.2E−08 | 5.23E−10 | −1.6E−12 |

TABLE 9

Example 3

| | INF | 1/40 | MOD |
|---|---|---|---|
| Fno | 4.50817 | 4.51304 | 4.54743 |
| F | 224.216 | 217.525 | 211.267 |
| ω | 3.50594 | 3.57518 | 3.6232 |
| D12 | 17.6907 | 15.6489 | 13.644 |
| D15 | 3.20112 | 5.24288 | 7.24778 |

Figure 13:
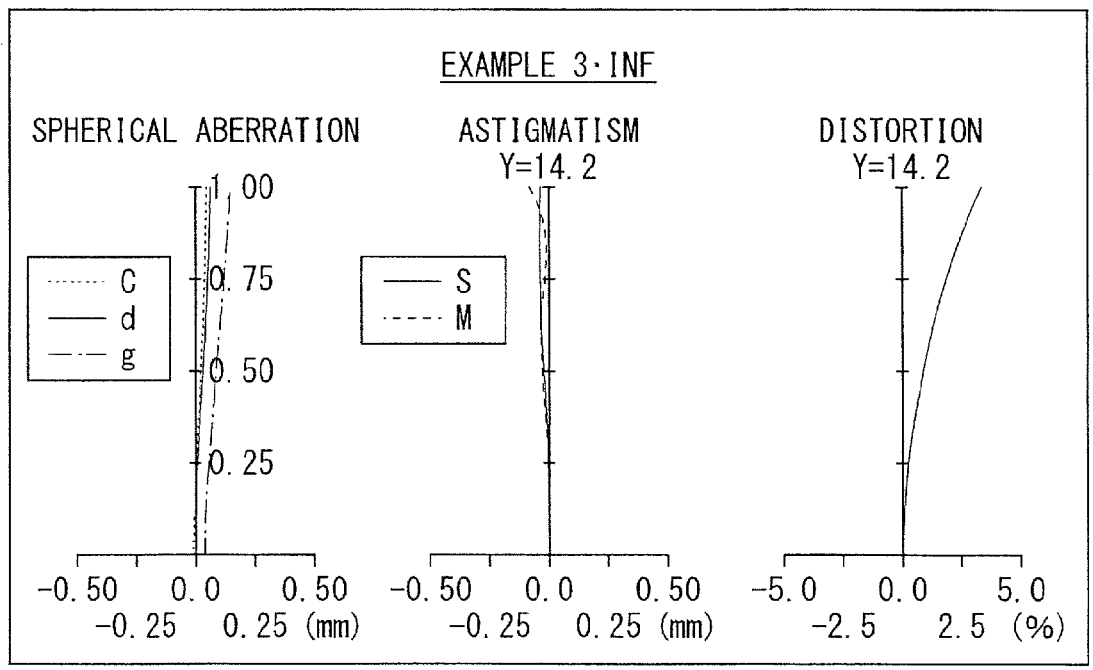
FIG. 13 is an aberration diagram illustrating spherical aberration, astigmatism, and distortion when focusing at infinity of a catadioptric lens system corresponding to Numerical Example 3.
Figure 14:
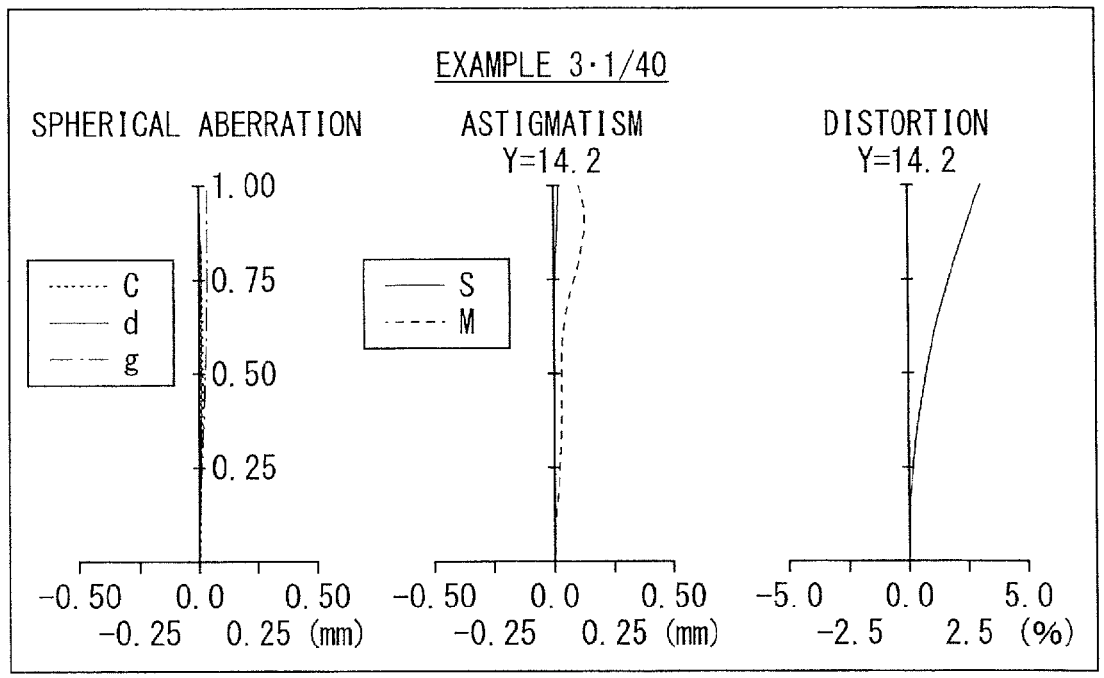
FIG. 14 is an aberration diagram illustrating spherical aberration, astigmatism, and distortion when focusing at an intermediate distance of the catadioptric lens system corresponding to Numerical Example 3.
Figure 15:
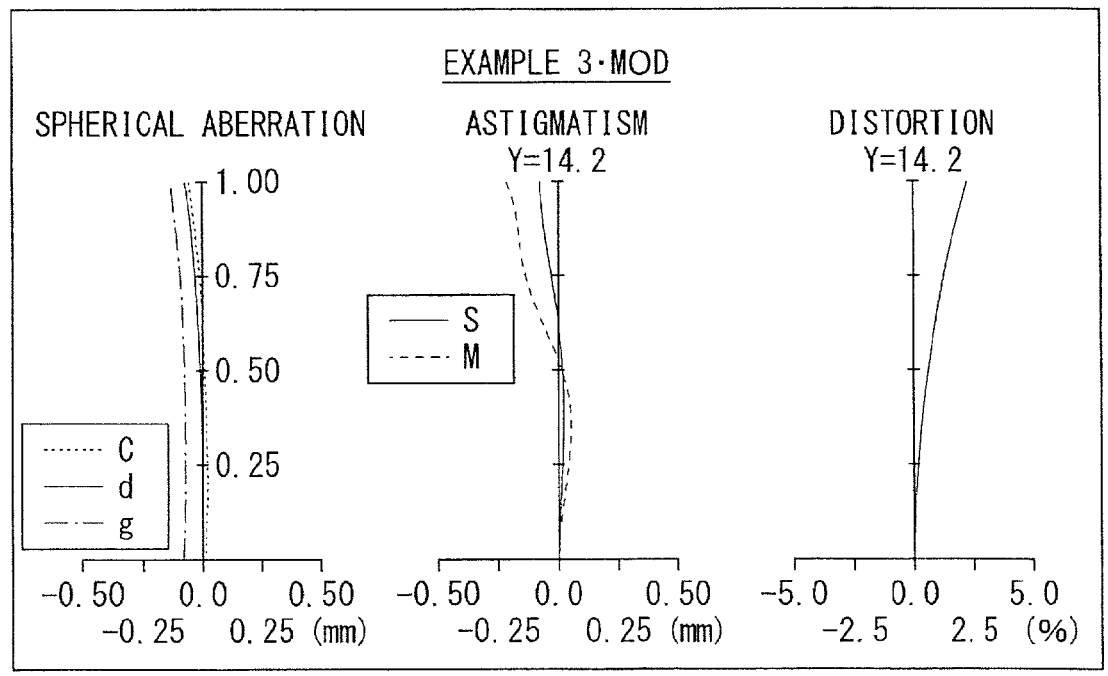
FIG. 15 is an aberration diagram illustrating spherical aberration, astigmatism, and distortion when focusing at a minimum distance of the catadioptric lens system corresponding to Numerical Example 3.

Aberration performance of the catadioptric lens system 3 corresponding to Numerical Example 3 is illustrated in FIGS. 13 to 15. FIG. 13 illustrates aberration when focusing at infinity. FIG. 14 illustrates aberration when focusing at the intermediate distance. FIG. 15 illustrates aberration when focusing at the minimum object distance.

FIGS. 13 to 15 illustrate, as aberration diagrams, spherical aberration, astigmatism (curvature of field), and distortion. In these aberration diagrams, aberrations at a reference wavelength of the d-line are illustrated. In diagrams of spherical aberration, aberrations at the C-line and aberrations at the g-line are also illustrated. In diagrams of astigmatism, a solid line (S) and a broken line (M) indicate aberration on a sagittal image plane and aberration on a meridional image plane, respectively. Y indicates an image height.

As can be seen from the aberration diagrams, various aberrations were favorably corrected, and superior imaging performance was obtained.

Numerical Example 4

Tables 10 to 12 illustrate a specific numerical example corresponding to the catadioptric lens system 4 according to a fourth configuration example illustrated in FIG. 4. More specifically, Table 10 illustrates basic lens data, Table 11 illustrates data of the aspherical surface, and Table 12 illustrates other data.

In Numerical Example 4, both surfaces of the concave lens L14 in the first lens group GR1 and both surfaces of the convex lens L21 of the second lens group GR2 were aspherical surfaces. Table 11 illustrates values of fourth-order, sixth-order, eighth-order, and tenth-order aspherical surface coefficients A4, A6, A8, and A10, respectively, together with values of comic constants K.

Table 12 illustrates focal lengths f, F-numbers Fno, and half angles of view ω when focusing at infinity, at the intermediate distance (a magnification of 1/40), and at the minimum object distance (MOD). In Numerical Example 4, surface separations D12 and D15 preceding and following the second lens group GR2 varied when focusing between infinity and the minimum object distance. Table 12 also illustrates values of surface separations D12 and D15 when focusing at infinity, at the intermediate distance, and at the minimum object distance.

TABLE 10

Example 4

| Lens Group | Surface No | Ri | Di | Ni | vdi |
|---|---|---|---|---|---|
| GR1 | 1 | 190.0625 | 6 | 1.641288 | 55.44878 |
|  | 2 | −1301.26 | 34.69951 |  |  |
|  | 3 | −112.121 | 2 | 1.888146 | 40.80476 |
|  | 4 | −173.52 | −2 | −1.88815 | 40.80476 |
|  | 5 | −112.121 | −26.4048 |  |  |
|  | 6 | −108.698 | −4.7232 | −1.65222 | 33.84 |
|  | 7 | −244.571 | 4.723198 | 1.652218 | 33.84 |
|  | 8 | −108.698 | 26.40484 |  |  |
|  | 9 | −112.121 | 2 | 1.888146 | 40.80476 |
|  | 10 | −173.52 | 1 |  |  |
|  | 11(ASP) | −270.724 | 1.015999 | 1.887646 | 37.22069 |
|  | 12(ASP) | 77.99773 | (D12) |  |  |
| GR2 | 13(ASP) | 29.36092 | 4 | 1.5334 | 55.90526 |
|  | 14(ASP) | −320.206 | 0 |  |  |
|  | 15(STO) | Infinity | (D15) |  |  |
| GR3 | 16 | 94.27551 | 2.741915 | 1.791948 | 47.49306 |
|  | 17 | 27.56611 | 28.55592 |  |  |
|  | 18 | 50.17239 | 2.259134 | 1.855049 | 23.7844 |
|  | 19 | 123.6433 | 16.3 |  |  |
| SG | 20 | Infinity | 2 | 1.51872 | 64.19733 |
|  | 21 | Infinity | 2 |  |  |

TABLE 11

Example 4

| Surface No | K | A4 | A6 | A8 | A10 |
|---|---|---|---|---|---|
| 11 | 394.1729 | 1.1E−05 | −3.7E−08 | 3.73E−10 | −3.1E−12 |
| 12 | −2.31269 | 1.08E−05 | −2.9E−08 | 4.06E−10 | −4.1E−12 |
| 13 | 0.964459 | −9.7E−07 | −1.7E−08 | 8.12E−10 | 2.58E−12 |
| 14 | 671.9132 | 7.83E−06 | −1.9E−08 | 8.78E−10 | 4.67E−12 |

TABLE 12

Example 4

|  | INF | 1/40 | MOD |
|---|---|---|---|
| Fno | 4.50785 | 4.56704 | 4.64076 |
| F | 191.132 | 186.499 | 182.14 |
| ω | 4.16566 | 4.19966 | 4.2177 |
| D12 | 8.0704 | 6.10792 | 4.1967 |
| D15 | 3 | 4.96248 | 6.8737 |

Figure 16:
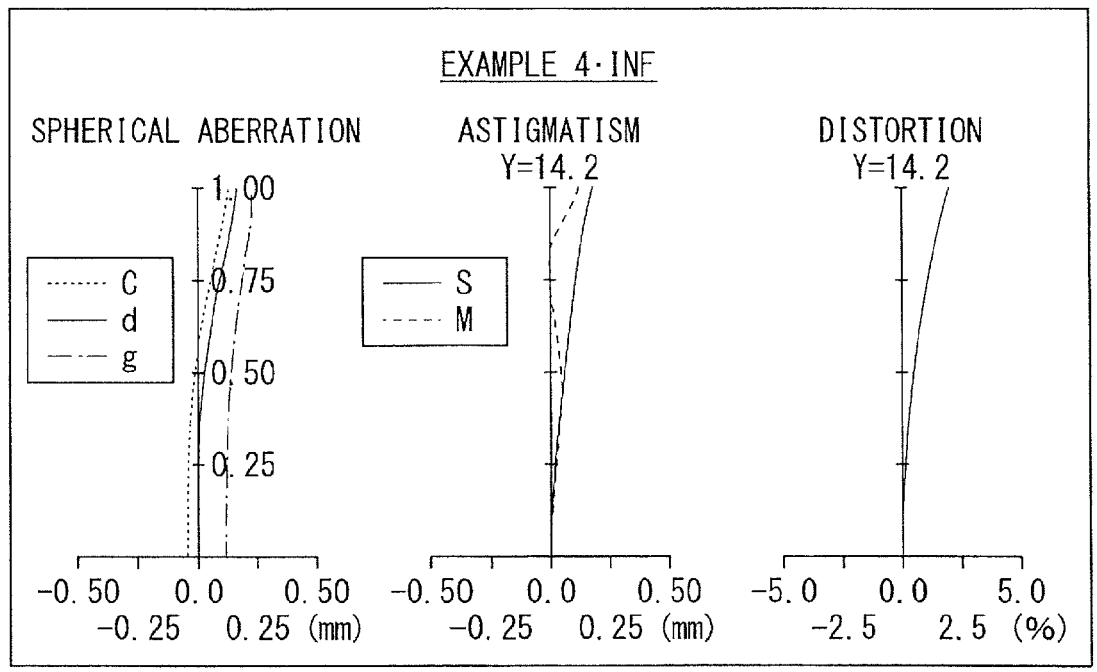
FIG. 16 is an aberration diagram illustrating spherical aberration, astigmatism, and distortion when focusing at infinity of a catadioptric lens system corresponding to Numerical Example 4.
Figure 17:
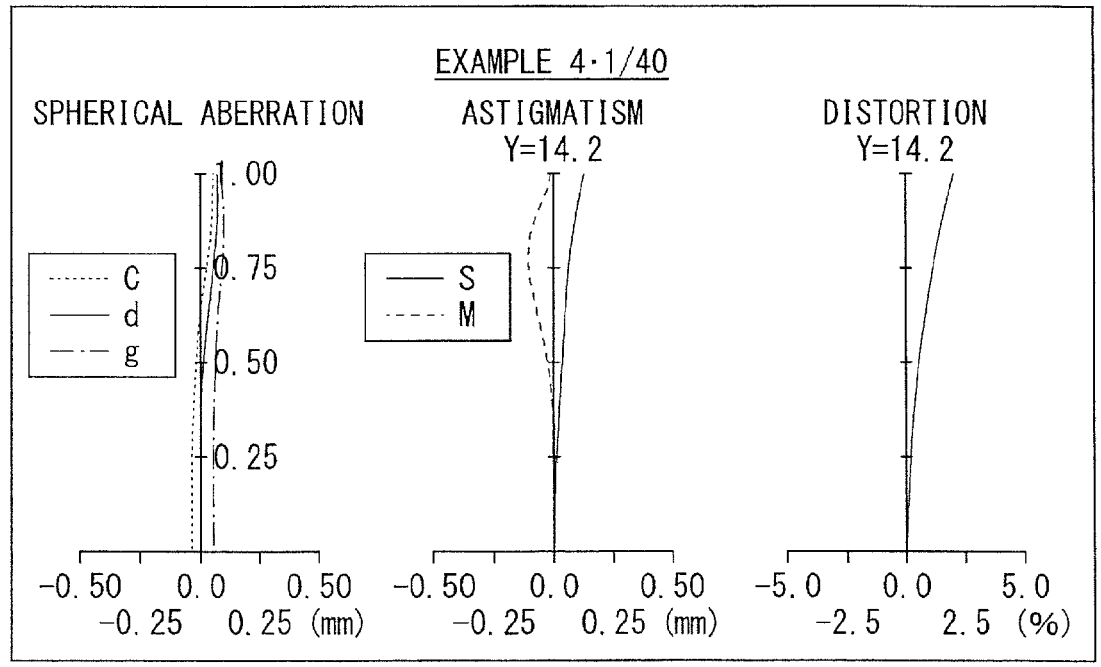
FIG. 17 is an aberration diagram illustrating spherical aberration, astigmatism, and distortion when focusing at an intermediate distance of the catadioptric lens system corresponding to Numerical Example 4.
Figure 18:
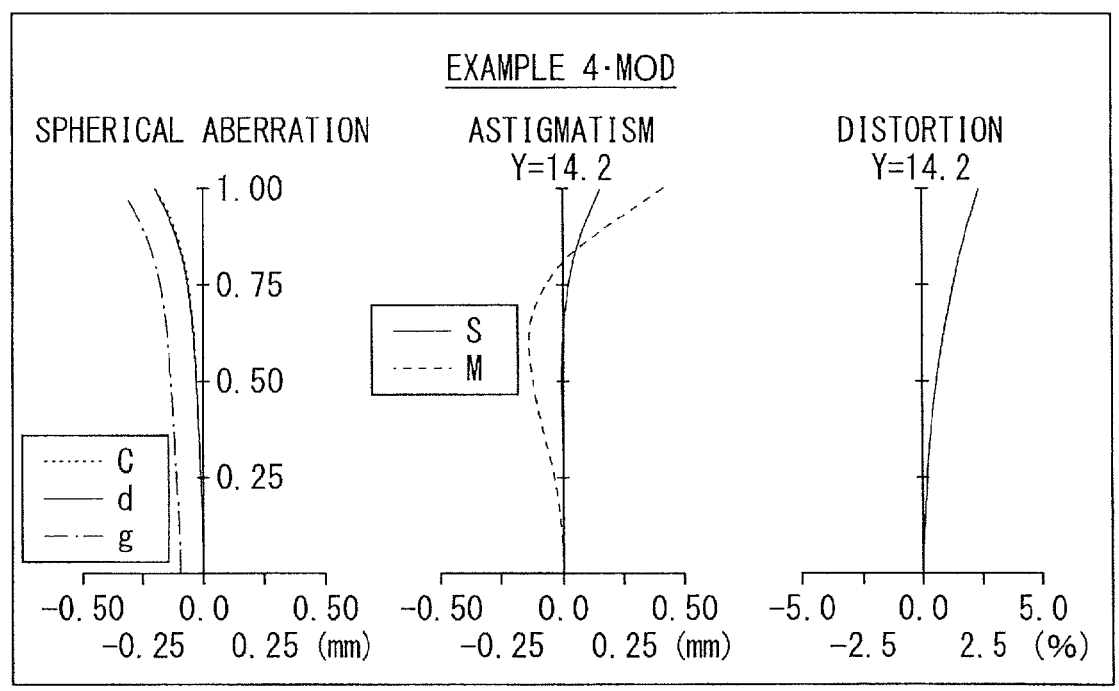
FIG. 18 is an aberration diagram illustrating spherical aberration, astigmatism, and distortion when focusing at a minimum distance of the catadioptric lens system corresponding to Numerical Example 4.

Aberration performance of the catadioptric lens system 4 corresponding to Numerical Example 4 is illustrated in FIGS. 16 to 18. FIG. 16 illustrates aberration when focusing at infinity. FIG. 17 illustrates aberration when focusing at the intermediate distance. FIG. 18 illustrates aberration when focusing at the minimum object distance.

FIGS. 16 to 18 illustrate, as aberration diagrams, spherical aberration, astigmatism (curvature of field), and distortion. In these aberration diagrams, aberrations at a reference wavelength of the d-line are illustrated. In diagrams of spherical aberration, aberrations at the C-line and aberrations at the g-line are also illustrated. In diagrams of astigmatism, a solid line (S) and a broken line (M) indicate aberration on a sagittal image plane and aberration on a meridional image plane, respectively. Y indicates an image height.

As can be seen from the aberration diagrams, various aberrations were favorably corrected, and superior imaging performance was obtained.

[Other Numerical Data of Respective Examples]

Table 13 illustrates all values relating to the above-described conditional expressions in the respective numerical examples. As can be seen from Table 13, the values of the respective numerical examples are within numerical ranges of the respective conditional expressions.

TABLE 13

| Conditional Expression | Example 1 | Example 2 | Example 3 | Example 4 |
|---|---|---|---|---|
| f2/f | 0.14 | 0.1 | 0.16 | 0.26 |
| f3/f | −0.78 | −0.19 | −0.64 | −1.27 |
| (r2 + r1)/(r2 − r1) | 6.78 | 6.58 | 8.9 | 4.65 |
| (r3 + r4)/(r3 − r4) | 5.4 | 5.61 | 6.45 | 2.6 |

5. Other Embodiments

The technology of the present disclosure is not limited to the above-described embodiment and the above-described examples, and may be variously modified.

For example, shapes and numerical values of components illustrated in the above-described numerical examples are mere examples for carrying out the technology, and the technical scope of the technology is not to be construed in a limiting sense by the shapes and numerical values.

Moreover, in the above-described embodiment and the above-described examples, a configuration including three lens groups is described; however, a configuration further including a lens not substantially having refractive power may be adopted.

Moreover, the technology of the present disclosure may have the following configurations.

[1] A catadioptric lens system including:

a first lens group including a concave mirror and a convex mirror and having positive refractive power;

a second lens group having positive refractive power; and a third lens group having negative refractive power,
the first to third lens groups being provided, in order, on a light path of incident light and in a direction of travel of the incident light.

[2] The catadioptric lens system according to [1], in which the second lens group is disposed on an image-plane side of the concave mirror.

[3] The catadioptric lens system according to [1] or [2], in which traveling of the second lens group in a direction parallel to an optical axis brings the catadioptric lens system into focus on an object in a short distance.

[4] The catadioptric lens system according to any one of [1] to [3], in which
the third lens group includes a concave lens located at a most-object-plane-side position thereof, and
shifting of the concave lens in a direction perpendicular to an optical axis allows the catadioptric lens system to be vibration-proof.

[5] The catadioptric lens system according to any one of [1] to [4], in which following conditional expression is satisfied:

$$0 < f2/f < 0.4 \quad (1)$$

where f2 is a focal length of the second lens group, and
f is a total focal length of the catadioptric lens system that is in focus on an object at infinity.

[6] The catadioptric lens system according to any one of [1] to [5], in which following conditional expression is satisfied:

$$-2.0 < f3/f < 0 \quad (2)$$

where f3 is a focal length of the third lens group.

[7] The catadioptric lens system according to any one of [1] to [6], in which
the concave mirror has a first surface on an object-plane side and a second surface on an image-plane side, the first surface being a concave transparent surface, and the second surface having a reflection surface in a peripheral region and a transparent surface in a center region,
following conditional expression is satisfied:

$$2.0 < (r2+r1)/(r2-r1) < 10 \quad (3)$$

where r1 is a curvature radius of the first surface of the concave mirror; and
r2 is a curvature radius of the second surface of the concave mirror.

[8] The catadioptric lens system according to any one of [1] to [7], in which
the concave mirror has a third surface on an object-plane side and a fourth surface on an image-plane side, the third surface being a reflection surface, and the fourth surface being a concave transparent surface,
following conditional expression is satisfied:

$$0 < (r3+r4)/(r3-r4) < 8.0 \quad (4)$$

where r3 is a curvature radius of the third surface of the convex mirror, and
r4 is a curvature radius of the fourth surface of the convex mirror.

[9] The catadioptric lens system according to any one of [1] to [8], further including a lens substantially not having refractive power.

[10] An image pickup unit provided with a catadioptric lens system and an image pickup device, the image pickup device configured to output an image pickup signal corresponding to an optical image formed by the catadioptric lens system, the catadioptric lens system including:

a first lens group including a concave mirror and a convex mirror and having positive refractive power;
a second lens group having positive refractive power; and
a third lens group having negative refractive power,
the first to third lens groups being provided, in order, on a light path of incident light and in a direction of travel of the incident light.

[11] The image pickup unit according to [10], in which the catadioptric lens system further includes a lens substantially not having refractive power.

It should be understood by those skilled in the art that various modifications, combinations, sub-combinations, and alterations may occur depending on design requirements and other factors insofar as they are within the scope of the appended claims or the equivalents thereof.

What is claimed is:
1. A catadioptric lens system, comprising:
a first lens group that includes, in order from an object-plane side, a convex lens, a convex mirror, a concave mirror and a first concave lens,
wherein the first lens group has a positive refractive power, and
wherein a surface of the concave mirror on an image-plane side has a reflection surface in a peripheral region and a transparent surface in a center region;
a second lens group that has a positive refractive power; and
a third lens group that includes a meniscus lens and a second concave lens located at a most-object-plane-side position thereof,
wherein the third lens group has a negative refractive power,
wherein the catadioptric lens system is configured to shift the second concave lens in a direction perpendicular to an optical axis to provide a vibration-proof catadioptric lens system,
wherein the first lens group, the second lens group, and the third lens group are provided, in order, on a light path of incident light and in a direction of travel of the incident light, and
wherein following conditional expression is satisfied:

$$0 < f2/f < 0.4 \quad (1)$$

where f2 is a focal length of the second lens group, and f is a total focal length of the catadioptric lens system that is in focus on an object at infinity.

2. The catadioptric lens system according to claim 1, wherein the second lens group is disposed on the image-plane side of the concave mirror.

3. The catadioptric lens system according to claim 1, wherein the catadioptric lens system is configured to focus on an object in a determined distance by movement of the second lens group in a direction parallel to the optical axis.

4. The catadioptric lens system according to claim 1, wherein following conditional expression is satisfied:

$$-2.0 < f3/f < 0 \quad (2)$$

where f3 is a focal length of the third lens group, and
f is the total focal length of the catadioptric lens system that is in focus on the object at infinity.

5. The catadioptric lens system according to claim 1, wherein
the concave mirror has a first surface on the object-plane side and a second surface on the image-plane side, and
wherein following conditional expression is satisfied:

$$2.0 < (r2+r1)/(r2-r1) < 10 \quad (3)$$

where r1 is a curvature radius of the first surface of the concave mirror; and r2 is a curvature radius of the second surface of the concave mirror.

6. The catadioptric lens system according to claim 1, wherein the convex mirror has a third surface on the object-plane side and a fourth surface on the image-plane side, the third surface is a reflection surface, and the fourth surface is a concave transparent surface, and wherein following conditional expression is satisfied:

$$0<(r3+r4)/(r3-r4)<8.0 \qquad (4)$$

where r3 is a curvature radius of the third surface of the convex mirror, and r4 is a curvature radius of the fourth surface of the convex mirror.

7. An image pickup unit, comprising:

a catadioptric lens system; and an image pickup device configured to output an image pickup signal that corresponds to an optical image by the catadioptric lens system, wherein the catadioptric lens system comprises:

a first lens group that includes, in order from an object-plane side, a convex lens, a convex mirror, a concave mirror and a first concave lens, wherein the first lens group has a positive refractive power, and wherein a surface of the concave mirror on an image-plane side has a reflection surface in a peripheral region and a transparent surface in a center region;

a second lens group that has a positive refractive power; and a third lens group that includes a meniscus lens and a second concave lens located at a most-object-plane-side position thereof, wherein the third lens group has a negative refractive power, wherein the catadioptric lens system is configured to shift the second concave lens in a direction perpendicular to an optical axis to provide a vibration-proof catadioptric lens system, wherein the first lens group, the second lens group, and the third lens group are provided, in order, on a light path of incident light and in a direction of travel of the incident light, and wherein following conditional expression is satisfied:

$$0<f2/f<0.4 \qquad (1)$$

where f2 is a focal length of the second lens group, and f is a total focal length of the catadioptric lens system that is in focus on an object at infinity.

8. A catadioptric lens system, comprising:

a first lens group that includes a concave mirror and a convex mirror, and that has a positive refractive power;

a second lens group that has a positive refractive power; and a third lens group that has a negative refractive power, wherein the first lens group, the second lens group, and the third lens group are provided, in order, on a light path of incident light and in a direction of travel of the incident light, wherein the concave mirror has a first surface on an object-plane side and a second surface on an image-plane side, the first surface is a concave transparent surface, and the second surface has a reflection surface in a peripheral region and a transparent surface in a center region, and wherein following conditional expression is satisfied:

$$2.0<(r2+r1)/(r2-r1)<10,$$

where r1 is a curvature radius of the first surface of the concave mirror; and r2 is a curvature radius of the second surface of the concave mirror.

9. A catadioptric lens system, comprising:

a first lens group that includes a concave mirror and a convex mirror, and that has a positive refractive power;

a second lens group that has a positive refractive power; and a third lens group that has a negative refractive power, wherein the first lens group, the second lens group and the third lens group are provided, in order, on a light path of incident light and in a direction of travel of the incident light, wherein the convex mirror has a first surface on an object-plane side and a second surface on an image-plane side, the first surface is a reflection surface, and the second surface is a concave transparent surface, and wherein following conditional expression is satisfied:

$$0<(r3+r4)/(r3-r4)<8.0,$$

where r3 is a curvature radius of the first surface of the convex mirror, and r4 is a curvature radius of the second surface of the convex mirror.

* * * * *